(12) United States Patent
Michalik et al.

(10) Patent No.: US 8,221,663 B2
(45) Date of Patent: Jul. 17, 2012

(54) METHOD OF MAKING CELLULOSIC FILLED THERMOPLASTIC COMPOSITES OF AN ANHYDRIDE CONTAINING COPOLYMER

(75) Inventors: Stephen Michalik, Beaver, PA (US); Douglas J. Gardner, Brewer, ME (US); Christopher H. West, Detroit, ME (US); Yousoo Han, Bangor, ME (US)

(73) Assignees: NOVA Chemicals Inc., Moon Township, PA (US); University of Maine, Orono, ME (US)

( * ) Notice: Subject to any disclaimer, the term of this patent is extended or adjusted under 35 U.S.C. 154(b) by 400 days.

(21) Appl. No.: 12/334,769

(22) Filed: Dec. 15, 2008

(65) Prior Publication Data

US 2009/0181207 A1 Jul. 16, 2009

Related U.S. Application Data

(60) Provisional application No. 61/020,481, filed on Jan. 11, 2008.

(51) Int. Cl.
*B29C 47/00* (2006.01)

(52) U.S. Cl. .................. 264/51; 264/176.1; 264/241

(58) Field of Classification Search .............. 521/13; 264/451, 51, 54
See application file for complete search history.

(56) References Cited

U.S. PATENT DOCUMENTS

| | | | |
|---|---|---|---|
| 3,765,934 A | 10/1973 | Gaylord | |
| 3,894,975 A | 7/1975 | Gaylord | |
| 3,908,902 A | 9/1975 | Collins et al. | |
| 3,958,069 A | 5/1976 | Gaylord | |
| 4,091,153 A | 5/1978 | Holman | |
| 4,098,877 A | 7/1978 | Ball et al. | |
| 4,380,522 A | 4/1983 | Georlette et al. | |
| 4,686,251 A | 8/1987 | Ostermann et al. | |
| 4,708,623 A | 11/1987 | Aoki et al. | |
| 5,002,713 A | 3/1991 | Palardy et al. | |
| 5,049,439 A * | 9/1991 | Robinson | 442/225 |
| 5,069,907 A | 12/1991 | Mixon et al. | |
| 5,087,400 A | 2/1992 | Theuveny | |
| 5,100,109 A | 3/1992 | Robbins, III | |

(Continued)

FOREIGN PATENT DOCUMENTS

CA 2626992 5/2007

(Continued)

OTHER PUBLICATIONS

English abstract of JP11080408, 1999.*

(Continued)

*Primary Examiner* — Christina Johnson
*Assistant Examiner* — Xue Liu
(74) *Attorney, Agent, or Firm* — Gary F. Matz

(57) ABSTRACT

A method of making foamed articles that includes providing a copolymer composition, combining the copolymer composition and cellulosic fibers, applying heat, mixing energy and pressure to the copolymer composition and cellulosic fibers mixture to form a foamable mixture, and forming the foamed article by placing the foamable mixture in a molding or extruding operation. The copolymer composition includes a copolymer of 51% to 99.9% of primary monomers, 0.1% to 49% of anhydride containing monomers, and 0% to 25% of other monomers and 0% to 30% of elastomeric polymers. This is combined at 30% to 99.99% copolymer composition with 0.01% to 70% by cellulosic fibers such that the copolymer anhydride groups react with the cellulosic fiber hydroxyl groups to produce a blowing agent byproduct to form a foamable mixture. The foamed article has a density of not more than 1.3 g/cm$^3$.

26 Claims, 7 Drawing Sheets

U.S. PATENT DOCUMENTS

| | | | |
|---|---|---|---|
| 5,151,238 A | | 9/1992 | Earl et al. |
| 5,238,749 A | | 8/1993 | Cueman et al. |
| 5,288,480 A | | 2/1994 | Gaffar et al. |
| 5,404,685 A | | 4/1995 | Collins |
| 5,417,904 A | | 5/1995 | Razi et al. |
| 5,439,946 A | * | 8/1995 | Klumperman et al. ......... 521/77 |
| 5,474,722 A | * | 12/1995 | Woodhams ................. 264/45.3 |
| 5,586,643 A | | 12/1996 | Zabron et al. |
| 5,773,138 A | | 6/1998 | Seethamraju et al. |
| 5,948,524 A | | 9/1999 | Seethamraju et al. |
| 5,981,067 A | | 11/1999 | Seethamraju et al. |
| 6,197,233 B1 | | 3/2001 | Mason et al. |
| 6,210,792 B1 | | 4/2001 | Seethamraju et al. |
| 6,265,037 B1 | | 7/2001 | Godavarti et al. |
| 6,280,667 B1 | | 8/2001 | Koenig et al. |
| 6,682,789 B2 | | 1/2004 | Godavarti et al. |
| 6,719,551 B2 | | 4/2004 | Polk, Jr. |
| 6,827,995 B2 | | 12/2004 | Hughes et al. |
| 6,869,558 B2 | | 3/2005 | Polk, Jr. et al. |
| 6,900,547 B2 | | 5/2005 | Polk, Jr. et al. |
| 6,936,200 B2 | | 8/2005 | Park et al. |
| 6,980,090 B2 | | 12/2005 | Mollenkopf |
| 7,208,219 B2 | | 4/2007 | Polk, Jr. et al. |
| 7,226,955 B2 | | 6/2007 | Subramonian et al. |
| 2003/0021915 A1 | * | 1/2003 | Rohatgi et al. ................. 428/15 |
| 2004/0253430 A1 | | 12/2004 | Polk, Jr. et al. |
| 2005/0124709 A1 | | 6/2005 | Krueger et al. |
| 2005/0154095 A1 | | 7/2005 | Heath et al. |
| 2006/0008967 A1 | | 1/2006 | Polk, Jr. et al. |
| 2006/0043629 A1 | * | 3/2006 | Drzal et al. ................... 264/140 |
| 2007/0164481 A1 | | 7/2007 | Polk |

FOREIGN PATENT DOCUMENTS

| | | | |
|---|---|---|---|
| JP | 11080408 A | * | 3/1999 |
| WO | 2008/046890 A2 | | 4/2008 |
| WO | 2008/046891 A1 | | 4/2008 |
| WO | 2008/046892 A2 | | 4/2008 |

OTHER PUBLICATIONS

Risvi, Ghaus; Matuana, Laurent M.; and Park, Chul B.; "Foaming of PS/Wood Fiber Composites Using Moisture as a Blowing Agent", Polymer Engineering and Science, Oct. 2000, vol. 40, No. 10, pp. 2124-2132.

Simonsen, John; Jacobson, Rodney; and Rowell, Roger; "Wood Fiber Reinforcement of Styrene-Maleic Anhydride Copolymers", The Fourth International Conference on Woodfiber-Plastic Composites, pp. 215-220, 1997.

Oporto, Gloria S.; Gardner, Douglas J.; Bernhardt, George and Neivandt, David J.; "Characterizing the Mechanism of Improved Adhesion of Modified Wood Plastic Composite (WPC) Surfaces", J. Adhesion Sci. Technol., vol. 21, No. 11, 2007, pp. 1097-1116.

Simonsen, John; Jacobson, Rodney; and Rowell, Roger, "Properties of Styrene-Maleic Anhydride Copolymers Containing Wood-Based Fillers", Composites and Manufactures Products, Technical Note, Forest Products Journal, vol. 48, No. 1, pp. 89-92, Jan. 1998.

* cited by examiner

US 8,221,663 B2

METHOD OF MAKING CELLULOSIC FILLED THERMOPLASTIC COMPOSITES OF AN ANHYDRIDE CONTAINING COPOLYMER

REFERENCE TO RELATED APPLICATION

This application claims the benefit of priority of U.S. Provisional Application Ser. No. 61/020,481 filed Jan. 11, 2008, entitled "Method of Making Cellulosic-Thermoplastic Composites of an Anhydride Containing Copolymer" which is incorporated by reference in its entirety.

BACKGROUND OF THE INVENTION

1. Field of the Invention

The present invention is directed to methods of making a thermoplastic composite material that includes a cellulosic material and an anhydride containing copolymer and to articles made from composite materials made according to the method.

2. Description of the Prior Art

Traditionally, fences and decks have been made of components fashioned from solid wood. Wood fences and decks are often considered more aesthetically appealing than those made of metal or cement, for example, wire fences or cement block walls or decks. However, construction of a wood fence or a wood deck is labor intensive. Solid wood components can be heavy and cumbersome. In addition, maintenance of a wood fence or deck is expensive. After a period of time, solid wood fence and deck components will naturally begin to break down from weather exposure and pest infestations. It is known that this deterioration can be tempered by treating the fence or deck with widely available weather resistant coatings, paints, varnishes, finishes and the like. Unfortunately, however, it is often only a matter of time before such treated fences or decks deteriorate requiring partial or complete replacement. Many solid wood materials that are suitable for fencing or decking are costly. In addition, because of natural variations in wood, replacement of individual components may result in an inconsistent, uneven appearance to the fence or deck.

Many products, technologies and ideas have been used to make extruded or molded thermoplastics as an alternative to wood in semi-structural outdoor applications such as decking, park walkways, children's playgrounds, seats and benches. The thermoplastic most widely used is polyethylene, typically a recycled product from HDPE, LDPE & LLDPE milk bottles, film etc. Other thermoplastics widely used include polystyrene, impact modified polystyrene, PVC and polypropylene. Many systems also use a cellulosic filler, typically wood or other natural fibers, compounded into the thermoplastic to enhance properties and make the compound look more like the wooden planks it replaces. These systems are rapidly gaining market acceptance, especially in decks where they have advantages of long-term durability and lack of maintenance. They have an additional advantage because of recent health concerns regarding the chemicals and preservatives used to treat wood for outdoor applications.

Many composites, such as cellulosic/polymer composites, are used as replacements for all-natural wood, particleboard, wafer board, and other similar material. For example, U.S. Pat. Nos. 3,908,902; 4,091,153; 4,686,251; 4,708,623; 5,002,713; 5,087,400; 5,151,238; 5,417,904; 5,948,524; 6,280,667; 6,827,995 and 6,936,200 relate to processes for making plastic/cellulose wood replacement products.

Solid composites of styrene-maleic anhydride and wood based fillers are disclosed in U.S. Pat. Nos. 3,765,934; 3,894,975 and 3,958,069; Canadian Published Patent Application No. 2,626,992 A1 and "Properties of Styrene-Maleic Anhydride Copolymers Containing Wood-Based Fillers", Simonsen et al., Forest Products Journal, Vol. 48, No. 1, pp. 89-92, January, 1998.

As compared to natural woods, cellulosic/polymer composites offer superior resistance to wear and tear. In particular, cellulosic/polymer composites have enhanced resistance to moisture. In fact, it is well known that the retention of moisture is a primary cause of the warping, splintering, and discoloration of natural woods. Moreover, cellulosic/polymer composites have the appearance of natural wood, and they may be sawed, sanded, shaped, turned, fastened, and finished in the same manner as natural woods. Consequently, cellulosic/polymer composites are commonly used for applications such as interior and exterior decorative house moldings, picture frames, furniture, porch decks, deck railings, window moldings, window components, door components, roofing structures, building siding, and other suitable indoor and outdoor components.

Those skilled in the art have recognized that excessive moisture content in a synthetic wood composition may result in a poor quality end product. In particular, excessive moisture content in a synthetic wood composition may result in an end component that is susceptible to cracking, blistering, and deteriorating appearance. Consequently, it may be necessary to dry any cellulosic material to a predetermined level prior to introducing it into the synthetic wood composition. Even after the cellulosic material is dried, it has a natural tendency to reabsorb moisture from the environment. As a result, it may also be necessary to store the dried cellulosic material in a moisture controlled environment in order to prevent the cellulosic material from reabsorbing additional moisture before being added to the synthetic wood composition. In light of these considerations, it may be difficult and costly to maintain sufficiently dry cellulosic material while shipping it between different locations.

Plastic fence components have been developed as alternatives or supplements to traditional, natural wood fences. For example, U.S. Pat. No. 5,100,109 describes a method of constructing a fence by providing a flexible, plastic, rollable fence board that can be unrolled and fastened to spaced apart fence posts. The flexible fence board is made with height and width dimensions simulating a standard wooden board and with a length of 350 feet or more. According to this patent, the fence board is formed in a continuous extrusion process of a flexible thermoplastic material.

U.S. Pat. No. 5,404,685, describes a wall or fence made in part of foamed polystyrene plastic components, more specifically, plastic columns and panels. Construction of a fence in accordance with this patent requires multiple steps. For example, wall or fence stability is achieved by pouring a reinforcing filler material, such as concrete, into a hollow of the polystyrene plastic columns after the columns have been secured to the ground. A hardened outer surface of the fence is achieved by applying an exterior finish, such as stucco or special exterior paint, to the fence or wall after the fence has been constructed.

However, the synthetic wood or wood composite products described above, typically have disadvantages when their mechanical properties, especially strength and stiffness are compared with the wood they replace. Further, the wood/cellulosic composites described above are susceptible to creep when subjected to continuous loads and/or high ambient temperatures. Additionally, these materials tend to warp after long term exposure to heat. Because of these structural limitations the use of the synthetic wood products described above is often restricted to less structural applications. For example, in decks they are used for deck boards but typically cannot be used for the vertical posts and joists that bear the loads of the whole structure.

Additionally, many of the synthetic wood products described above have densities greater than water, which makes them unfavorable materials to use in marine and related applications.

Thus, there is a need in the art to provide polymer-wood composite products that overcome the above-described problems, as well as methods of making such polymer-wood composite materials.

SUMMARY OF THE INVENTION

The present invention is directed to a method of making a foamed cellulosic fiber-thermoplastic composite article. The method includes the steps of providing a copolymer composition, combining the copolymer composition and cellulosic fibers, applying heat, mixing energy and pressure to the copolymer composition and cellulosic fibers mixture to form a foamable mixture, and forming the foamed article by placing the foamable mixture in a molding or extruding operation.

The copolymer composition includes i) a copolymer formed by polymerizing a mixture containing a) about 51% to about 99.9% by weight of one or more primary monomers, b) about 0.1% to about 49% by weight of one or more anhydride containing monomers, and c) optionally about 1% to about 25% by weight of one or more other polymerizable monomers; and optionally about 0.1% to about 30% by weight of one or more elastomeric polymers, based on the weight of the copolymer.

About 30% to about 99.99% by weight of the copolymer composition is combined with about 0.01% to about 70% by weight of one or more cellulosic fibers based on the weight of the combination.

The heat, mixing energy and pressure provide i) mixing of the copolymer composition and the cellulosic fibers; ii) reaction of anhydride groups in the copolymer with hydroxyl groups in the cellulosic fibers; and iii) production of a blowing agent as a byproduct of the reaction in ii) to provide a foamable mixture of the copolymer composition and the cellulosic fibers.

DETAILED DESCRIPTION OF THE INVENTION

Figure 1:
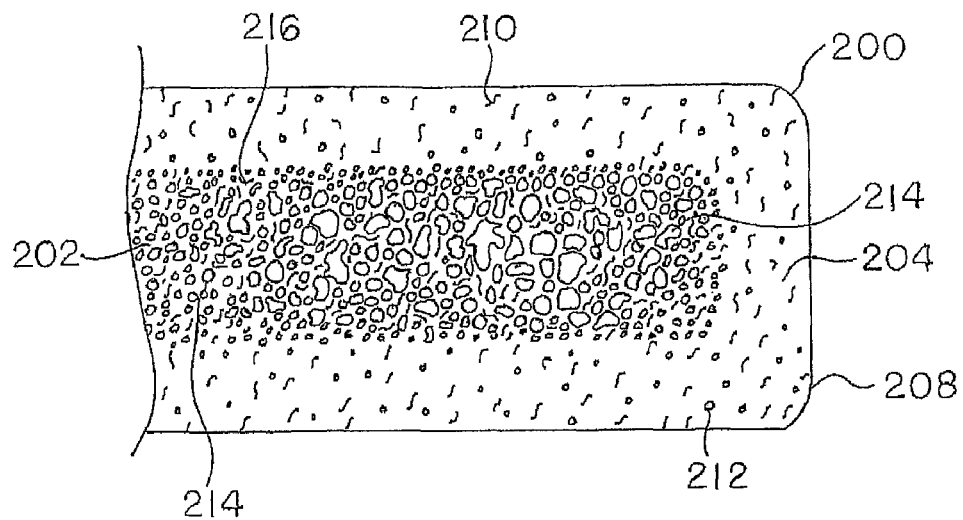
FIG. 1 is a perspective view of an extruded article according to embodiments of the invention.

For the purpose of the description hereinafter, the terms "upper", "lower", "inner", "outer", "right", "left", "vertical", "horizontal", "top", "bottom", and derivatives thereof, shall relate to the invention as oriented in the drawing Figures. However, it is to be understood that the invention may assume alternate variations and step sequences except where expressly specified to the contrary. It is also to be understood that the specific devices and processes, illustrated in the attached drawings and described in the following specification, is an exemplary embodiment of the present invention. Hence, specific dimensions and other physical characteristics related to the embodiment disclosed herein are not to be considered as limiting the invention. In describing the embodiments of the present invention, reference will be made herein to the drawings in which like numerals refer to like features of the invention.

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

As used herein the term "aspect ratio" refers to the ratio of the length of a fiber particle to the diameter of the fiber particle.

As used herein the term "cellulosic fiber" refers to particulates, fibrous cellulose, fibers, and bundles of fibers produced by plants that are generally based on arrangements of cellulose.

As used herein, the term "elastomeric polymer" refers to a natural or synthetic polymer, rubber, or rubberoid material, which has the ability to undergo deformation under the influence of a force and regain its original shape once the force has been removed.

As used herein, the term "encased sinusoidal foam structure" refers to an extruded article that includes an outer casing encompassing the outer cross-sectional surface of the article and a foamed interior portion, within the outer casing, that has a lower density than the outer casing and has a wave-like structure in the extrusion direction oscillating about a midpoint of the article, where the peak deviations from the midpoint are in contact with and fused to an inner portion of the outer casing.

As used herein the terms "foam" or "foamed" refer to a solid that includes the cellulosic fiber-thermoplastic composite described herein with voids, pockets, cells, a cellular structure and/or bubbles dispersed within the solid that contain a gas, which can include, as non-limiting examples, air, carbon dioxide, water vapor, and combinations thereof.

As used herein the term "flax fibers" refers to cellulosic fibers derived from plants, sometimes referred to as linseed, that are a member of the genus *Linum* in the family Linaceae.

As used herein the term "hardwood fiber" refers to cellulosic fibers derived from broad-leaved trees, non-limiting examples including oak, eucalyptus and birch, having a relatively higher density and hardness compared to softwood trees.

As used herein the term "jute fibers" refers to the long, soft, shiny vegetable fiber produced from plants in the genus *Corchorus*, family Malvaceae.

As used herein the term "kenaf fibers" refers to cellulosic fibers derived from Kenaf (*Hibiscus cannabinus*), a species of *Hibiscus*, native to southern Asia.

As used herein the term "hardwood pulp" refers to hardwood fiber that has been crushed with grinders, crushed with refiners using steam at high pressures and temperatures, chemically broken up, or a combination of methods to produce a soft shapeless mass.

As used herein the term "hemp fibers" refers to cellulosic fibers derived from plants belonging to the genus *Cannabis*.

As used herein, the terms "(meth)acrylic" and "(meth) acrylate" are meant to include both acrylic and methacrylic acid derivatives, such as the corresponding alkyl esters often referred to as acrylates and (meth)acrylates, which the term "(meth)acrylate" is meant to encompass.

Unless otherwise specified, all molecular weight values are determined using gel permeation chromatography (GPC) using appropriate polystyrene standards. Unless otherwise indicated, the molecular weight values indicated herein are weight average molecular weights (Mw).

As used herein, the term "polymer" is meant to encompass, without limitation, homopolymers, copolymers and graft copolymers.

As used herein the term "ramie fibers" refers to cellulosic fibers derived from a flowering plant in the nettle family Urticaceae, native to eastern Asia.

As used herein the term "softwood fiber" refers to cellulosic fibers derived from cone-bearing seed plants with vascular tissue, non-limiting examples including cedars, cypresses, douglas-firs, firs, junipers, kauris, larches, pines, hemlock, redwoods, spruces, and yews.

As used herein the term "softwood pulp" refers to softwood fiber that has been crushed with grinders, crushed with refiners using steam at high pressures and temperatures, chemically broken up, or a combination of methods to produce a soft shapeless mass.

As used herein the term "wood flour" refers to finely pulverized wood, generally made from sapless softwoods such as pine or fir, or in some cases from hardwoods.

In the present invention, an article containing a foamed cellulosic fiber-thermoplastic composite that includes a copolymer containing anhydride functional groups and can be produced by combining the fiber and thermoplastic in an extruder under pressure and extruding a self-foaming composite to form a foamed article.

Under the conditions in the extruder, the anhydride groups in the copolymer are able to react and bind to the hydroxyl groups in the cellulosic fiber resulting in a stronger compounded matrix of thermoplastic and cellulose. This copolymer-cellulose reaction results in a composite having superior tensile properties along with other superior physical properties compared to prior art materials.

An aspect of the reaction between anhydride groups in the copolymer with the hydroxyl groups in the cellulosic fiber is a resulting byproduct that can include water and/or carbon dioxide. Under extrusion conditions, the water and/or carbon dioxide act as a blowing agent, which causes a cellular structure or foam to form in at least a portion of the cross-section of the extruded article. The foam or cellular structure causes the density of the extruded article to be lower, often less dense than water, and provides many of the unique properties of the cellulosic fiber-thermoplastic composite articles made according to the invention.

In embodiments of the invention, the mixture of copolymer and cellulose are exposed to extruder temperatures of at least 180° C., in some cases at least 185° C., in other cases at least 190° C., in some instances at least 195° C. and in other instances at least 200° C. The exact extruder temperature will vary based on the length of time at temperature, melt temperature and/or glass transition temperature (Tg) of the copolymer, and the activation temperature required for a particular copolymer-cellulose combination to react as described herein. The mixture of copolymer and cellulose are exposed to extruder temperatures of up to 240° C., in some cases up to 237° C., in other cases up to 233° C., in some instances up to 229° C. and in other instances up to 225° C. The exact maximum extruder temperature will vary based on the thermal degradation expected from the copolymer and cellulosic material being used. Maximum temperatures are chosen so as to minimize thermal degradation of the copolymer and cellulosic material. The extruder temperatures the copolymer and cellulosic material are exposed to in order to promote the reaction between them can be any temperature or range between any of the temperatures described above.

In embodiments of the invention, the mixture of copolymer and cellulose are exposed to extruder pressures of at least 1 psi (6.9 KPa), in some cases at least 5 psi (34.5 KPa), and in other cases at least 10 psi (69 KPa). Further, the mixture of copolymer and cellulose are exposed to extruder pressures of up to 2000 psi (13,790 KPa), in some cases up to 1000 psi (6895 KPa), in other cases up to 500 psi (3447 KPa), in some instances up to 250 psi (1724 KPa) and in other instances up to 150 psi (1034 KPa). The exact extruder pressure will vary based on the particular copolymer-cellulose combination being used and the amount and type of foaming desired from the reaction as described herein. The extruder pressures the copolymer and cellulosic material are exposed to in order to allow for the foaming reaction between the copolymer and cellulosic material can be any pressure or range between any of the pressures described above.

In particular embodiments of the invention, a center portion of a cross-section of the present cellulosic fiber-thermoplastic composite article is foamed and the portion around the edge or perimeter of the present cellulosic fiber-thermoplastic composite article is minimally foamed or not foamed at all.

The density of the foamed cellulosic fiber-thermoplastic composite articles, as a whole, of this embodiment are often less than 1.1 g/cm$^3$, in many cases less than 1 g/cm$^3$, and can be less than 0.97 g/cm$^3$, in some cases less than 0.9 g/cm$^3$, in other cases less than 0.85 g/cm$^3$, and in some instances less than 0.8 g/cm$^3$. The density of the foamed cellulosic fiber-thermoplastic composite articles will depend on the composition of the copolymer, amount and type of cellulosic material, the amount of moisture present, as well as the particular processing conditions. In particular aspects of the invention and depending on any additional fillers that may be used, the density of the micro foamed material can be up to 1.3 and in some cases up to 1.2 g/cm$^3$.

Figure 2:
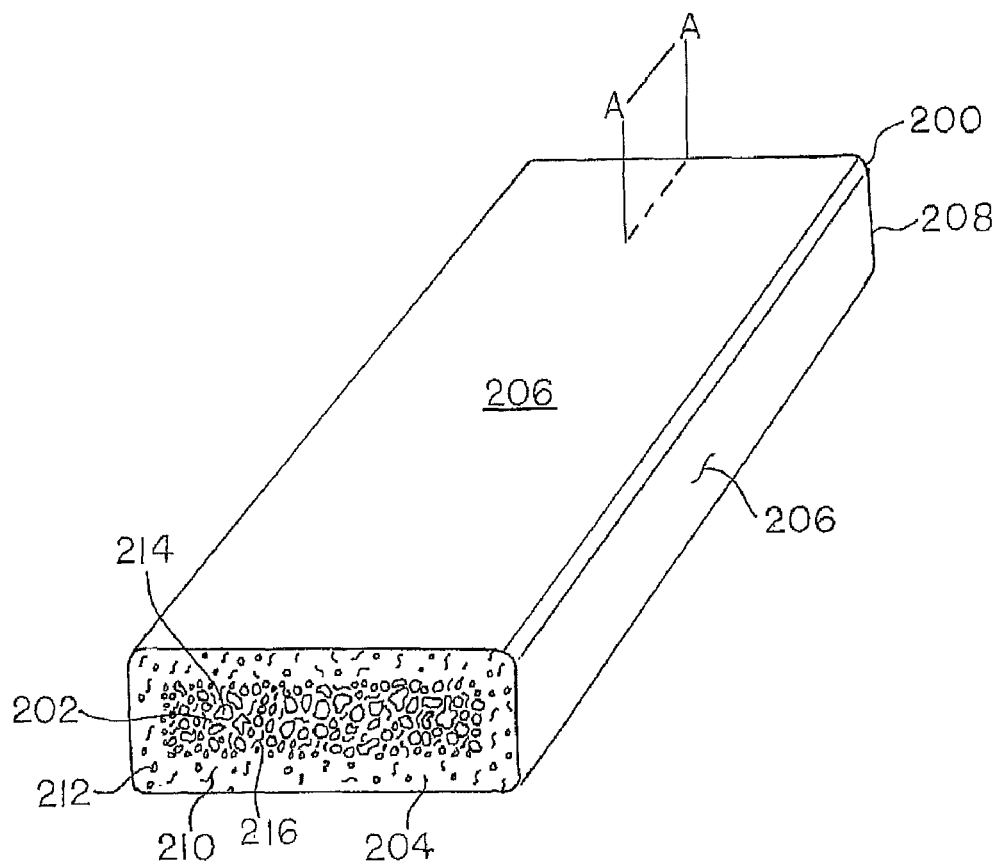
FIG. 2 is a cross-section at A-A of an end of an extruded article according to embodiments of the invention.

In embodiments of the invention, as shown for example in FIGS. 1 and 2, extruded article 200 has structured foam central portion 202 and micro foamed outer portion 204. In this embodiment, central portion 202 does not touch outer surface 206 of article 200, but extends for all or part of the length of article 200. In some aspects of this embodiment, the extrusion process is modified to close of one or both ends 208 of article 200 so that outer portion 204 encompasses end 208.

In some embodiments of the invention, the central portion can be highly foamed to the extent that the extruded cellulosic fiber-thermoplastic composite article is nearly or completely hollow.

As used herein, the term "micro foamed" refers to a material where the cellulosic fibers 210 are well, and in many cases homogenously, dispersed with the copolymer and small voids 212, typically less than 50 μm, are dispersed throughout the material.

As used herein, the term "structured foam" refers to a material where the cellulosic fibers 212 are well, and in many cases homogenously, dispersed with the copolymer and large voids 214, typically greater than 50 μm, are located throughout the material, separated by walls 216, that can be from 50 μm to 10 mm thick. In some cases, the size distribution of the large voids can be large.

Figure 3:
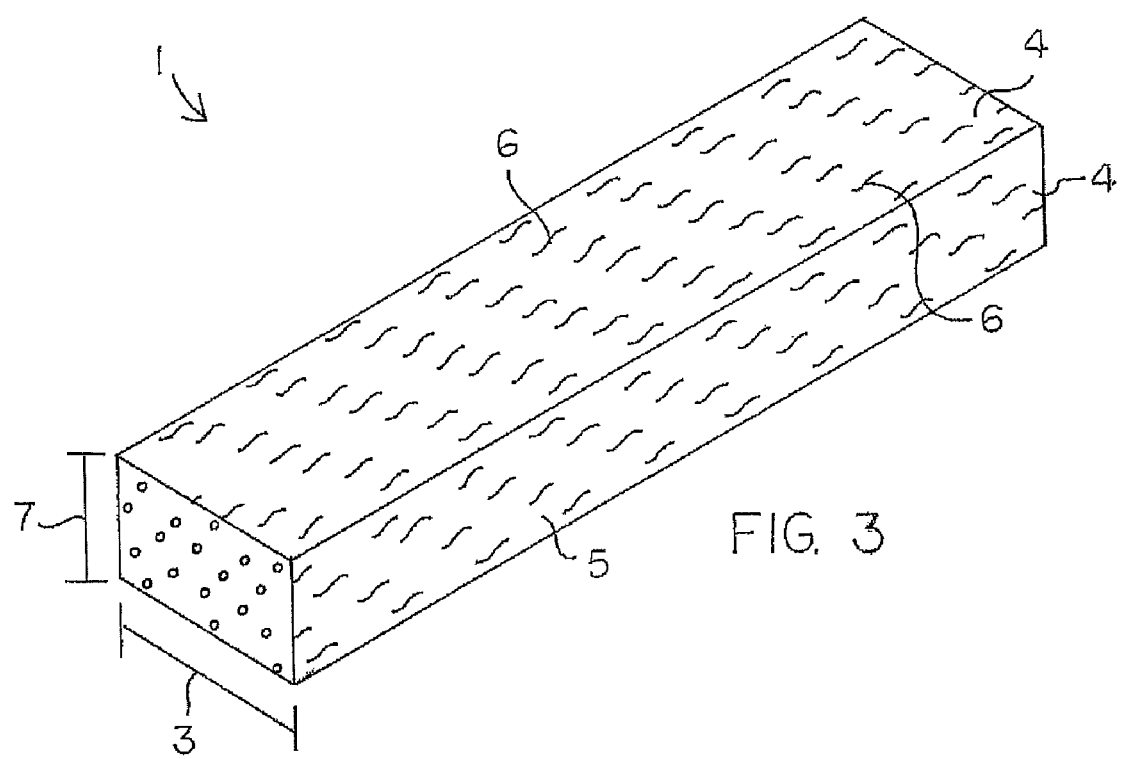
FIG. 3 is a perspective view of an extruded article according to embodiments of the invention.

In embodiments of the invention shown in FIG. 3, extruded article 1 can be uniformly micro foamed. As such, cellulosic fibers 6 are well, and in many cases homogenously, dispersed with the copolymer and small voids, typically less than 50 μm, are dispersed throughout the material.

Thus, an important aspect of the present invention is controlling the nature of the foamed article (micro foamed or structured foam), the density of the foamed article as well as the shape of the finally produced foamed cellulosic fiber-thermoplastic composite.

The amount of copolymer in the cellulosic fiber-thermoplastic composite will vary depending on its intended use as described herein and the physical properties desired in the article. As such, the cellulosic fiber-thermoplastic composite will contain the copolymer at a level of at least about 10%, in some cases at least about 15%, in other cases at least about 20%, in some instances at least about 25%, in other instances at least about 30%, and in some situations at least about 35% by weight of the cellulosic fiber-thermoplastic composite. Also, the copolymer can be present at up to about 94.9%, in some cases up to about 92.5%, in other cases up to about 90%, in some instances up to about 85%, in some instances up to about 80%, in other instances up to about 75% and in some situations up to about 70% by weight of the cellulosic fiber-thermoplastic composite. The amount of copolymer in the cellulosic fiber-thermoplastic composite can be any value or range between any of the values recited above.

The amount of cellulosic fiber in the cellulosic fiber-thermoplastic composite will vary depending on its intended use as described herein, the amount and type of foaming desired, and the physical properties desired in the article. As such, the amount of cellulosic fiber in the cellulosic fiber-thermoplastic composite can be at least about 0.01%, in some situations at least about 0.1%, in other situations at least about 1%, in particular situations at least about 5%, in some cases at least about 10%, in other cases at least about 15% and in some instances at least about 20% by weight of the cellulosic fiber-thermoplastic composite. Also, the amount of cellulosic fiber in the cellulosic fiber-thermoplastic composite can be up to about 70%, in some situations up to about 65%, in other situations up to about 60%, in some cases up to about 55%, in other cases up to about 50%, in some instances up to about 45%, and in other instances up to about 40% by weight of the cellulosic fiber-thermoplastic composite. The amount of cellulosic fiber in the cellulosic fiber-thermoplastic composite can be any value or range between any of the values recited above.

The copolymer used in the cellulosic fiber-thermoplastic composite provides improved strength and stiffness compared with prior art wood or cellulosic filled molded polyolefin thermoplastics. Particularly, the copolymer used in the present cellulosic fiber-thermoplastic composite is less susceptible to creep and/or warpage when subjected to continuous loads and/or high ambient temperatures. The heat stability, as measured by the deflection temperature under load (DTUL) according to ISO-75-2, of the present cellulosic fiber-thermoplastic composite is also improved compared to prior art wood or cellulosic filled molded thermoplastics.

The copolymer used in the cellulosic fiber-thermoplastic composite contains residues formed by polymerizing a mixture that contains one or more primary monomers, one or more anhydride containing monomers and optionally one or more other polymerizable monomers.

The primary monomers are selected from styrenic monomers and olefinic monomers and combinations thereof.

The amount of primary monomer residues in the present copolymer depends on the physical properties desired in the article to be made, the amount and type of cellulosic fiber to be used and the type and amount of elastomeric polymer that is used. Typically, the amount of primary monomer residues present in the copolymer is at least about 51%, in some cases at least 55% and in other cases at least 60% based on the weight of the copolymer. Also, the amount of primary monomer residues present in the copolymer can be up to about 99.9%, in some situations up to about 99%, in other situations up to about 95%, in some cases up to about 90%, in other cases up to about 85%, in some instances up to about 80%, and in other instances up to about 75% by weight of the copolymer. The amount and type of primary monomer residues in the copolymer can be any value or range between any of the values recited above.

Any suitable styrenic monomer can be used as one or more of the primary monomers in the invention. Suitable styrenic monomers are those that provide the desirable properties in the present article as described herein. Non-limiting examples of suitable styrenic monomers include, but are not limited to styrene, p-methyl styrene, α-methyl styrene, tertiary butyl styrene, dimethyl styrene, nuclear brominated or chlorinated derivatives thereof and combinations thereof.

Any suitable olefinic monomer can be used as one or more of the primary monomers in the invention. Suitable olefinic monomers are those that provide the desirable properties in the present article as described herein. Non-limiting examples of suitable olefinic monomers include, but are not limited to ethylene; alpha olefins such as propylene, 1-butene, 1-pentene, 1-hexene, 1-heptene, 1-octene, 1-nonene, 1-decene and 1-dodecene; 2-butene; 2-pentene; 2-hexene; 2-octene; and combinations thereof.

The amount of anhydride containing monomer residues in the present copolymer depends on the physical properties desired in the article to be made and the amount and type of cellulosic fiber to be used. Typically, the amount of anhydride containing monomer residues present in the copolymer is at least about 0.1%, in some instances at least about 1%, in other instances at least about 5%, in some cases at least 10% and in other cases at least 15% based on the weight of the copolymer. Also, the amount of anhydride containing monomer residues present in the copolymer can be up to about 49%, in some cases up to about 45%, in other cases up to about 40%, and in some instances up to about 35% by weight of the copolymer. The amount of anhydride containing monomer residues in the copolymer can be any value or range between any of the values recited above.

Any suitable anhydride containing monomer can be used in the invention. Suitable anhydride containing monomers are those that provide the desirable properties in the present article as described herein and include, but are not limited to those corresponding to Formulas I and II:

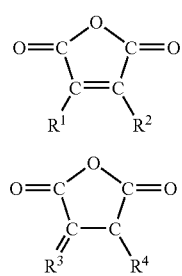

where $R^1$, $R^2$ and $R^4$ are each independently H or a $C_1$-$C_8$ linear, branched or cyclic alkyl or alkenyl radical and $R^3$ is a $C_1$-$C_8$ linear or branched alkyl group.

As non-limiting examples, a suitable anhydride containing monomer according to Formula I is maleic anhydride and a suitable anhydride containing monomer according to Formula II is itaconic anhydride.

The amount of and type of other monomer residues in the present copolymer depends on the physical properties desired in the article to be made, the amount and type of cellulosic fiber to be used and the type and amount of elastomeric polymer that is used. When included, the amount of the optional other monomer residues present in the copolymer is at least about 1%, in some cases at least 5% and in other cases at least 10% based on the weight of the copolymer. Also, the amount of other monomer residues present in the copolymer can be up to about 25%, in some cases up to about 20%, and in other cases up to about 15%, by weight of the copolymer. The amount of other monomer residues in the copolymer can be any value or range between any of the values recited above.

Any suitable polymerizable monomer can be included as an "other monomer" as described herein. Suitable other monomers are those that provide the desirable properties in the present article as described herein and include, but are not limited to divinylbenzene, conjugated dienes, $C_1$-$C_{12}$ linear, branched or cyclic alkyl mono- or di-esters of maleic acid, fumaric acid and itaconic acid; $C_1$-$C_{12}$ linear, branched or cyclic alkyl esters of acrylic acid and methacrylic acid, acrylonitrile, methacrylonitrile, and combinations thereof.

The resulting copolymer formed by polymerizing the above-described monomers can have a weight average molecular weight (Mw, measured using GPC with polystyrene standards) of at least 20,000, in some cases at least 35,000 and in other cases at least 50,000. Also, the Mw of the resulting copolymer can be up to 1,000,000, in some cases up to 750,000, and in other cases up to 500,000. The Mw of the copolymer can be any value or range between any of the values recited above.

As a non-limiting example, suitable copolymers that can be used in the invention include the styrene/maleic anhydride copolymers available under the trade name DYLARK® from NOVA Chemicals Inc., Pittsburgh, Pa. and the FUSABOND® materials available from E. I. Dupont de Nemours and Company, Wilmington, Del.

Optionally, and in some embodiments of the invention, one or more elastomeric polymers can be included in the cellulosic fiber-thermoplastic composite, to provide a rubber modified cellulosic fiber filled thermoplastic composite.

When included in the present cellulosic fiber-thermoplastic composite, the amount of elastomeric polymers in the cellulosic fiber-thermoplastic composite will vary depending on its intended use as described herein and the physical properties desired in the article. As such, the amount of elastomeric polymers in the cellulosic fiber-thermoplastic composite can be at least about 0.1%, in some cases at least about 0.25%, in other cases at least about 0.5%, in some instances at least about 1%, in other instances at least about 2.5% and in some situations at least about 5% by weight of the cellulosic fiber-thermoplastic composite. Also, the amount of elastomeric polymers in the cellulosic fiber-thermoplastic composite can be up to about 30%, in some cases up to about 25% and in other cases up to about 20% by weight of the cellulosic fiber-thermoplastic composite. The amount of elastomeric polymers in the cellulosic fiber-thermoplastic composite can be any value or range between any of the values recited above.

The elastomeric polymers can be combined with the copolymer by blending or admixing with the copolymer or by combining the elastomeric polymers with the monomers prior to or during polymerization.

Any suitable elastomeric polymer can be used in the invention. In some embodiments of the invention, combinations of elastomeric polymers are used to achieve desired properties. Suitable elastomeric polymers are those that provide the desirable properties in the present article as described herein and are desirably capable of resuming their shape after being deformed.

In an embodiment of the invention, the elastomeric polymers include, but are not limited to homopolymers of butadiene or isoprene or other conjugated diene, and random, block, AB diblock, or ABA triblock copolymers of a conjugated diene (non-limiting examples being butadiene and/or isoprene) with a styrenic monomer as defined above and/or acrylonitrile. In particular embodiments of the invention the elastomeric polymers include acrylonitrile-butadiene-styrene copolymers (ABS).

In a particular embodiment of the invention, the elastomeric polymers include one or more block copolymers selected from diblock and triblock copolymers of styrene-butadiene, styrene-butadiene-styrene, styrene-isoprene, styrene-isoprene-styrene, partially hydrogenated styrene-isoprene-styrene and combinations thereof.

As used herein, butadiene refers to 1,3-butadiene and when polymerized, to repeat units that take on the 1,4-cis, 1,4-trans and 1,2-vinyl forms of the resulting repeat units along a polymer chain.

In some embodiments of the invention, the elastomeric polymer does not include diene type monomers. In these instances the elastomeric polymers can include copolymers of $C_1$-$C_{12}$ linear, branched or cyclic olefins, $C_1$-$C_{12}$ linear, branched or cyclic alkyl esters of (meth)acrylic acid, styrenic monomers, and/or (meth)acrylonitrile. Non-limiting examples of this type of elastomeric polymer are the ELVALOY® modifiers for synthetic resins available from E. I. Dupont de Nemours and Company, Wilmington, Del.

In an embodiment of the invention, the elastomeric polymer has a number average molecular weight (Mn) greater than 6,000, in some cases greater than 8,000, and in other cases greater than 10,000 and a weight average molecular weight (Mw) of at least 25,000 in some cases not less than about 50,000, and in other cases not less than about 75,000 and the Mw can be up to 500,000, in some cases up to 400,000 and in other cases up to 300,000. The weight average molecular weight of the elastomeric polymer can be any value or can range between any of the values recited above.

Non-limiting examples of suitable block copolymers that can be used in the invention include the STEREON® block copolymers available from the Firestone Tire and Rubber Company, Akron, Ohio; the ASAPRENE™ block copolymers available from Asahi Kasei Chemicals Corporation, Tokyo, Japan; the KRATON® block copolymers available from Kraton Polymers, Houston, Tex.; and the VECTOR® block copolymers available from Dexco Polymers LP, Houston, Tex.

Any suitable cellulosic fiber can be used in the cellulosic fiber-thermoplastic composite of the invention. Suitable cellulosic fibers include those that, together with the copolymer and optional elastomeric polymers provide the desired properties in the article described herein.

The cellulosic fiber-thermoplastic composite includes cellulosic materials that are derived from wood as well as those not derived from wood (i.e., other than wood flour, fibers, or pulp, etc.) and can be used, either in addition to or instead of wood-derived materials. Thus, cellulosic fibers can include cellulose in any of a number of forms, including as nonlimiting examples wood flour or fibers, wood pulp, wheat fibers, rice hulls, kenaf, flax, hemp, hardwood fiber, kenaf fibers, wheat fibers, rice hulls, hemp fibers, jute fibers, flax fibers, ramie fibers, softwood fibers, hardwood pulp, softwood pulp, wood flour and combinations thereof. In many cases wood fibers or flour are used, and any commercially available variety is generally suitable for use according to the invention.

The cellulosic fibers can include high aspect ratio materials, low aspect ratio materials, and combinations of each. High aspect ratio fibers offer an advantage, that being a higher strength and modulus for the same level of fiber content in the cellulosic fiber-thermoplastic composite. The use of cellulosic fiber materials is advantageous for several reasons. Cellulosic fibers can generally be obtained at relatively low cost. Cellulosic fibers are relatively light in weight, can maintain a high aspect ratio after processing in high intensity thermokinetic mixers, and exhibit low abrasive properties, thus extending machine life.

In embodiments of the invention, the high aspect ratio cellulosic fibers have an aspect ratio of greater than 10, in some cases at least about 15 and in other cases at least about 20 and can have an aspect ratio of up to about 1,000, in some cases up to about 750, in other cases up to about 500 and in other cases up to about 250. In particular embodiments of the invention, the high aspect ratio cellulosic fibers have an aspect ratio of greater than 50, in some cases greater than 100, in other cases greater than 200 and in some instances greater than 500. The aspect ratio of the high aspect ratio cellulosic fibers can be any value or range between any of the values recited above.

In embodiments of the invention, the low aspect ratio cellulosic fibers have an aspect ratio of at least about 1, in some cases at least about 1.25 and in other cases at least about 1.5 and can have an aspect ratio of up to 10, in some cases up to about 7.5, in other cases up to about 5 and in some instances up to about 2.5. The aspect ratio of the low aspect ratio cellulosic fibers can be any value or range between any of the values recited above.

In embodiments of the invention, the cellulosic fibers have a diameter of at least about 1, in some cases at least about 2.5, and in other cases at least about 5 µm and can have a diameter of up to about 500, in some cases up to about 400, in other cases up to about 300, in some instances up to about 250 µm. The diameter of the low aspect ratio cellulosic fibers can be any value or range between any of the values recited above.

In some embodiments of the invention, the wood flour has a particle size of not more than 10, in some cases not more than 20, in other cases not more than 30 and in some instances not more than 40 mesh, in other instances not more than 50 mesh and in some situations not more than 60 mesh. The wood flour can have a moisture content of not more than 10%, in some cases not more than 9%, in other cases not more than 8%, in some instances not more than 7%, in some situations not more than 6% and in other instances not more than 5% by weight. However, any variety of hardwood or softwood could be used, usually dependent on the location of the manufacturer.

In some embodiments of the invention, the cellulosic fiber is dried prior to being used to make the present cellulosic fiber-thermoplastic composite. In these embodiments, the amount of moisture in the cellulosic fiber material is less than about 3%, in some cases less than about 2%, and in other cases less than about 1% by weight of the cellulosic fiber material.

It should be noted that no bright line exists for determining the line between when a particular cellulosic fiber is no longer considered wood flour and is instead considered wood fiber. As such, according to the present invention, it will often be the case that wood flour will contain some wood fibers and wood fibers will contain some amount of wood flour.

In some embodiments of the invention, the cellulosic fiber can include recycled paper, and in particular embodiments, pelletized recycled paper.

In an embodiment of the invention, the cellulosic fiber-thermoplastic composite can be compounded or otherwise blended with one or more other polymers to form a cellulosic fiber-thermoplastic composite blend. Suitable other polymers that can be blended or compounded with the cellulosic fiber-thermoplastic composite composition include, but are not limited to crystal polystyrene, high impact polystyrenes, polyphenylene oxide, copolymers of styrene and maleic anhydride and/or $C_1$-$C_{12}$ linear, branched or cyclic alkyl (meth)acrylates, rubber-modified copolymers of styrene and maleic anhydride and/or $C_1$-$C_{12}$ linear, branched or cyclic alkyl (meth)acrylates, polycarbonates, polyamides (such as the nylons), polyesters (such as polyethylene terephthalate, PET), polyolefins (such as polyethylene, polypropylene, and ethylene-propylene copolymers), polyphelyne ether (PPE), polyvinylidene fluoride, acrylonitrile/(meth)acrylate copolymers, ethylene/vinyl acetate copolymers, polyoxymethylene, acetal copolymer, ethylene vinyl alcohol copolymers, and combinations thereof.

In particular embodiments of the invention, the compounded blend includes polyoxymethylene (POM or Acetal), which, as a non-limiting example is available under the trade name DELRIN® from E.I. DuPont De Nemours and Company, Wilmington, Del.

When a cellulosic fiber-thermoplastic composite blend is used, the blend will typically include at least 1%, in some instances at least 5%, and in other instances at least 10%, in some cases at least 25%, and in other cases at least 35% and up to 99%, in some instances up to 95%, in other instances up to 90%, in some cases up to 75%, and in other cases up to 65% by weight based on the blend of the present cellulosic fiber-thermoplastic composite. Also, the blend will typically include at least 1%, in some instances at least 5%, and in other instances at least 10%, in some cases at least 25%, and in other cases at least 35% and up to 99%, in some instances up to 95%, in other instances up to 90%, in some cases up to 75%, and in other cases up to 65% by weight based on the blend of the other polymers. The amount of the present cellulosic fiber-thermoplastic composite and other polymers in the blend is determined based on the desired properties in the articles to be made using the blend composition. The amount of the present cellulosic fiber-thermoplastic composite and other polymers in the blend can be any value or range between any of the values recited above.

The present cellulosic fiber-thermoplastic composite can include one or more additives known in the art. Suitable additives include, but are not limited to heat stabilizers, light stabilizers, antioxidants; plasticizers, dyes, pigments; anti-blocking agents; slip agents; lubricants; coloring agents; ultraviolet light absorbers; fillers; anti-static agents; impact modifiers, antimicrobial agents, and combinations thereof. Unless otherwise indicated, each of the additives can be included in amounts of less than about 5, in some cases less than about 4, in other cases less than about 3, and in some instances less than about 2 weight % based on the cellulosic fiber-thermoplastic composite. Typically, the total amount of additives in the cellulosic fiber-thermoplastic composite will be less than about 12, in some cases less than about 10 and in other cases less than about 8 weight % based on the cellulosic fiber-thermoplastic composite.

Suitable heat stabilizers that can be used in the invention include, but are not limited to, phosphite or phosphonite stabilizers and hindered phenols, non-limiting examples being the IRGANOX® stabilizers and antioxidants available from Ciba Specialty Chemicals.

Generally, any conventional ultra-violet light (UV) stabilizer known in the art can be utilized in the present invention. Non-limiting examples of suitable UV stabilizers include 2-hydroxy-4-(octyloxy)-benzophenone, 2-hydroxy-4-(octyl oxy)-phenyl phenyl-methanone, 2-(2'-hydroxy-3,5'di-ter-amylphenyl) benzotriazole, and the family of UV stabilizers available under the trade TINUVIN® from Ciba Specialty Chemicals Co., Tarrytown, N.Y.

Suitable plasticizers that can be used in the invention include, but are not limited to cumarone-indene resin, a terpene resin, and oils.

As used herein, "pigments and/or dyes" refer to any suitable inorganic or organic pigment or organic dyestuff. Suitable pigments and/or dyes are those that do not adversely impact the desirable physical properties of the article. Non-limiting examples of inorganic pigments include titanium dioxide, iron oxide, zinc chromate, cadmium sulfides, chromium oxides and sodium aluminum silicate complexes. Non-limiting examples of organic type pigments include azo and diazo pigments, carbon black, phthalocyanines, quinacridone pigments, perylene pigments, isoindolinone, anthraquinones, thioindigo and solvent dyes. The pigments can be white or any other color. The white pigment can be produced by the presence of titanium oxide, zinc oxide, magnesium oxide, cadmium oxide, zinc chloride, calcium carbonate, magnesium carbonate, etc., or any combination thereof in the amount of 0.1 to 20% by weight, depending on the white pigment to be used. The colored pigment can be produced by carbon black, phtalocyanine blue, Congo red, titanium yellow or any other coloring agent known, as for example, in the printing industry.

Suitable anti-blocking agents, slip agents or lubricants include, but are not limited to silicone oils, liquid paraffin, synthetic paraffin, mineral oils, petrolatum, petroleum wax, polyethylene wax, hydrogenated polybutene, higher fatty acids and the metal salts thereof, linear fatty alcohols, glycerine, sorbitol, propylene glycol, fatty acid esters of monohydroxy or polyhydroxy alcohols, phthalates, hydrogenated castor oil, beeswax, acetylated monoglyceride, hydrogenated sperm oil, ethylenebis fatty acid esters, and higher fatty amides. Suitable lubricants include, but are not limited to, ester waxes such as the glycerol types, the polymeric complex esters, the oxidized polyethylene type ester waxes and the like, metallic stearates such as barium, calcium, magnesium, zinc and aluminum stearate, salts of 12-hydroxystearic acid, amides of 12-hydroxystearic acid, stearic acid esters of polyethylene glycols, castor oil, ethylene-bis-stearamide, ethylene bis cocamide, ethylene bis lauramide, pentaerythritol adipate stearate and combinations thereof.

Suitable ultraviolet light absorbers that can be used in the invention include, but are not limited to, 2-(2-hydroxyphenyl)-2H-benzotriazoles, for example, known commercial hydroxyphenyl-2H-benzotriazoles and benzotriazoles hydroxybenzophenones, acrylates, malonates, sterically hindered amine stabilizers, sterically hindered amines substituted on the N-atom by a hydroxy-substituted alkoxy group, oxamides, tris-aryl-o-hydroxyphenyl-s-triazines, esters of substituted and unsubstituted benzoic acids, nickel compounds, and combinations thereof.

Suitable fillers are those that do not adversely impact, and in some cases enhance, the desirable physical properties of the article. Suitable fillers include, but are not limited to, calcium carbonate in ground and precipitated form, barium sulfate, talc, glass, clays such as kaolin and montmorolites, mica, silica, alumina, metallic powder, glass spheres, barium stearate, calcium stearate, aluminum oxide, aluminum hydroxide, titanium dioxide, diatomaceous earth, glass fibers, fiberglass and combinations thereof. The amount of filler is in many cases less than 10% of the total weight of the cellulosic fiber-thermoplastic composite.

Examples of suitable anti-static agents include, but are not limited to glycerine fatty acid, esters, sorbitan fatty acid esters, propylene glycol fatty acid esters, stearyl citrate, pentaerythritol fatty acid esters, polyglycerine fatty acid esters, and polyoxethylene glycerine fatty acid esters.

Examples of suitable impact modifiers include, but are not limited to high impact polystyrene (HIPS), styrene/butadiene block copolymers, ABS, copolymers of $C_1$-$C_{12}$ linear, branched or cyclic olefins, $C_1$-$C_{12}$ linear, branched or cyclic alkyl esters of (meth)acrylic acid, styrenic monomers, styrene/ethylene/-butene/styrene, block copolymers, styrene/ethylene copolymers. The amount of impact modifier used is typically in the range of 0.5 to 25% of the total weight of cellulosic fiber-thermoplastic composite.

Examples of suitable antimicrobial agents that can be used in the invention include one or more of the various fungicides, herbicides, insecticides, and other such materials known in the art. As non-limiting examples, the antimicrobial agents can include sodium, potassium, calcium, zinc, copper, and barium salts of carbonate, silicate, sulfate, halide, and borate in all forms; zinc carboxylates; boric acids; sodium dichromate; copper chrome arsenate (CCA); chromated copper borate (CBC); ammoniacal copper arsenate (ACA); ammoniacal copper zinc arsenate (ACZA); copper chromium fluoride (CFK); copper chromium fluoroborate (CCFB); copper chromium phosphorous (CCP); propiconazole tebuconazole; organo-chloride such as pentachlorophenol (PCP); quaternary ammonium compounds (AAC); copper 8-hydroxyquinoline or copper oxene; tri-n-butyltin oxide (TBTO); tri-n-butyltin naphthenate (TBTN); didecyldimethylammonium bromide (DDAB); didecyldimethylammonium chloride (DDAC); silver ions, mercury ions, carbamates, isothiazolones, chlorinated phenoxy and polyhexamethylene beguanidide hydrochlorides, and combinations thereof.

Other antimicrobial agents that can be used in the invention include, but are not limited to 1-[(6-chloro-3-pyridinyl)methyl]-4,5-dihydro-N-nitro-1H-imidazol-2-amine and 3-(2,2-dichloroethenyl)-2,2-di-methylcyclo-propanecarboxylic acid cyano(3-phenoxyphenyl)-methyl ester (cypermethrin), the active ingredient in, for example, Demon TC sold by Zeneca; 3-(2,2-dichloro-ethenyl)-2,2-dimethylcyclopropanecarboxylic acid (3-phenoxyphenyl)methyl ester (permethrin), the active ingredient in, for example, Dragnet FT and Torpedo sold by Zeneca; and 1-[(6-chloro-3-pyridinyl) methyl]-4,5-dihydro-N-nitro-1H-imidazol-2-amine (imidacloprid), the active ingredient in, for example, Premise sold by Bayer.

Non-limiting examples of some specific antimicrobial agents include, but are not limited to barium metaborate monohydrate (sold under the trade-mark Busan 11-M1, manufactured by Buckman Labs), 2-N-octyl-4-isothiazolin-3-one Vinyzene IT (sold under the trade-mark Skane Morton, manufactured by DOW), octyl isothiazolone, dichloro-octyl isothiazolone, trichloro-phenoxy phenol, Triclosan, 10,10'-oxybisphenoarsine Vinyzene BP (sold under the trademark Morton, manufactured by DOW), silver-hydroxyapatite complex (sold under the trade-mark Apacider, manufactured by Sangi Co. Ltd.), 2,3,5,6-tetrachloro-4(methyl sulphonyl) pyridine (sold under the trade-mark Densi I, manufactured by ICI), 2-(thiocyanomethylthio) benzothiazole (sold under the trade-mark Busan 1030, manufactured by Buckman Labs), N-(trichloromethyl thio)-phthalimide (sold under the trade-mark Fungitrol II, manufactured by Huels), 3-iodo-2-propynyl butyl carbamate (sold under the trade-mark Polyphase AF-1, manufactured by Troy Chemical). This list is by no means exhaustive but includes some representatives which can be applied according to the current invention to control biodegradative processes.

Other antimicrobial agents that can be used include, as non-limiting examples, PHMD, Triclosan, Irgansan DP300, MICROBAN® products, chlorinated phenoxy 5-chloro-2-(2, 4-dichlorophenoxy)phenol, polyhexamethlyene biguanidie hydrochloride, CH3635, Ster-zac, 5-chloro-2-(2,4-dichlorophenoxy)-phenol, chloro-2-)2,4-dichloro)phenol, Chloro-2-(2,4-dichlorophenoxy)phenol, Lexol 300, trichloro-2-hydroxydiphenyl ether, and the antimicrobial agents described in the following U.S. Patents, the relevant portions of which are herein incorporated by reference; U.S. Pat. Nos. 5,586, 643, 5,288,480, 4,098,877, 5,069,907 and 5,238,749. Many of these compounds are sold by the Microban Products Company, Huntsville, N.C. Other suitable chemical components having known antimicrobial biocidal or biostatic characteristics may also be used in the present invention.

Non-limiting examples of natural antimicrobial agents that can be used in the invention include, but are not limited to essential oils such as tea tree oil, mint oil, leleshwa oil, sandalwood oil, clove oil, lavender oil, *nigella sativa* (Black cumin) oil, onion and combinations thereof.

As non-limiting examples, the present foamed cellulosic fiber-thermoplastic composite article can be made by forming pellets of the cellulosic fiber-thermoplastic composite and then molding or extruding the pellets to form the present article, or the cellulosic fiber-thermoplastic composite composition can be formed in an extruder and extruded directly to form the articles of the invention.

In embodiments of the present methods, either method can include dry blending the copolymer, cellulosic fiber and optional elastomeric polymers and/or optional other additives and subsequently adding them to an extruder.

In embodiments of the invention, the copolymer, cellulosic fibers and optional elastomeric polymers and/or optional other additives can be combined by melt blending.

In other embodiments of the present method, either method can include adding the copolymer and optionally the elastomeric polymer to a first extruder and then combining them with the cellulosic fiber and optional other additives in a second extruder.

In embodiments of the invention, the copolymer and optional elastomeric copolymer can be combined by melt blending.

Regardless of which method is used, during the blending step, the copolymer and cellulosic fiber are typically intimately mixed by high shear mixing to form a copolymer-cellulosic fiber composite where the mixture includes a continuous copolymer phase and cellulosic fiber dispersed phase with some reaction taking place between the copolymer and cellulosic fibers as described herein. The dispersed cellulosic fibers can be suspended or dispersed throughout the copolymer phase. The manufacture of the dispersed fiber phase within a continuous copolymer phase can require substantial mechanical input. Such input can be achieved using a variety of mixing means including extruder mechanisms where the materials are mixed under conditions of high shear until the appropriate degree of wetting, intimate contact and reaction are achieved.

During the extrusion and/or pelletizing process, the cellulosic fibers, copolymer, optional elastomeric polymers, and any optional additives are intimately contacted at high temperatures and pressures to insure that the cellulosic fiber and copolymer are wetted, mixed and extruded in a form such that the copolymer, on a microscopic basis, coats and flows into the pores, cavities, etc., of the cellulosic fibers. In many cases, the fibers are substantially oriented by the extrusion process in the extrusion direction. Such substantial orientation causes overlapping of adjacent parallel fibers and copolymer coating of the oriented fibers resulting in a material useful for manufacture of improved structural members with improved physical properties. The degree of orientation (the fraction of fibers oriented in the extrusion or machine direction) can be about 20%, in many cases about 30% above random orientation which is about 45 to 50%. The reaction between the anhydride groups in the copolymer and the hydroxyl groups in of the cellulosic fiber often "lock" this orientation in place as well as providing the blowing agent that acts to foam the composition when it exits the extruder.

In the methods of the present invention, moisture control can be an important element of the process. Depending on the equipment used and processing conditions, control of the water content of the components can be important in forming a desirable article with controlled foam characteristics. When the amount of moisture in the cellulosic fiber during the processing steps described herein is too high, it can result in the water flashing from the surface of the newly extruded article as a result of a rapid volatilization in the form of a steam bubble deep in the interior of the extruded article, which can pass from the interior through the hot thermoplastic extrudate leaving a substantial flaw. In a similar fashion, surface water can bubble and leave cracks, bubbles or other surface flaws in the extruded article.

In embodiments of the invention, the cellulosic fibers are dried at a temperature less than 150° C., in some cases less than 170° C., in other cases less than 180° C. and in some situations less than 185° C. Additionally, the cellulosic fiber is dried for at least 10 minutes, in some cases at least 20 minutes and in other cases at least 30 minutes and can be dried for several days or in many situations up to 24 hours, in some cases up to 20 hours, in other cases up to 16 hours, in some instances up to 12 hours and in other instances up to 8 hours. The drying time and temperature can be or range between any of the values recited above and will depend on the amount of moisture in the cellulosic fiber, the type of fiber, and other drying conditions.

In embodiments of the invention, the extruder is vented to release undesirable moisture from the cellulosic material and/or to release excess pressure in the extruder caused by the copolymer-cellulose reaction.

In the various embodiments of the invention, the cellulosic fiber-thermoplastic composite can be extruded by melt mixing at a temperature sufficient to flow the copolymer and extruding through an extruder die any of the cellulosic fiber-thermoplastic composite disclosed herein one or more times. Both single-pass or multiple-pass extrusion can be used in the invention.

In various embodiments of the invention, the cellulosic fiber-thermoplastic composite can be formed using a Banbury mixer, or a Brabender mixer and/or a twin-screw extruder. The cellulosic fiber-thermoplastic composite can be blended and kneaded using methods known in the art at any suitable stage in the process until the point just before production of the final product. Blending can be effected by various methods, such as using a suitable mixer such as tumbler, Henschel mixer, etc., or supplying the measured amounts of the component materials to the extruder hopper by a feeder and mixing them in the extruder. Kneading may also be accomplished by suitable known methods such as using a single- or double-screw extruder.

In many embodiments of the invention, the compounding steps will generally include an extruder. The extruder may be a single screw or a twin screw extruder. In many cases, the extruder is one that can carry out the compounding process under vacuum or pressure.

In embodiments of the invention, sufficient pressure is maintained in the extruder where the copolymer and cellulosic fibers are combined in order to prevent any water vapor, carbon dioxide or other evolved blowing agent from the reaction of the copolymer and cellulosic fiber from escaping the copolymer and cellulosic fiber mixture.

When the cellulosic fiber-thermoplastic composite composition is formed in an extruder and extruded directly to form the articles of the invention, the pressure on the copolymer and cellulosic fiber mixture is released after the mixture is discharged from the extruder and enters a die or other shaping device that causes the extruded mixture to expand to form a foamed article having a desired shape and or dimension.

In many embodiments of the invention, vacuum is applied after extruding the reacted/foamed copolymer-cellulosic composite through a die in order to maintain a desired profile while the composite is cooled below its melt temperature and/or its Tg.

In embodiments of the invention, the extrusion and shaping conditions are adjusted to provide a material that is a completely micro foamed structure or is a combination of structured foam and micro foam structures as described above.

Thus, embodiments of the present invention provide a method of making the foamed cellulosic fiber-thermoplastic composite articles directly. The method can include a) combining the copolymer and optional elastomeric polymers to form a compounded copolymer; b) combining the cellulosic fibers with the compounded copolymer to form a cellulosic compounded copolymer; and c) extruding the cellulosic compounded copolymer to form an extruded article.

In embodiments of the invention, profile extrusion techniques are used to form the article. In this embodiment, the cellulosic fiber-thermoplastic composite is added to an extruder using any of the methods described above and the material is conveyed continuously forward by a rotating screw inside a heated barrel and is softened by both friction and heat. The softened cellulosic fiber-thermoplastic composite can then be forced through a die and cooled to form the article. In some embodiments, the softened cellulosic fiber-thermoplastic composite is forced through a die and fed directly into a cool water bath where the cellulosic fiber-thermoplastic composite solidifies to form the article.

In embodiments of the invention, vacuum calibration units can be used with the profile extruder to provide a platform for sizing the cellulosic fiber-thermoplastic composite profiles, such as window frames, fencing panels, slats for window blinds and decking boards.

As indicated above, the present foamed cellulosic fiber-thermoplastic composite article can be made by forming pellets of the cellulosic fiber-thermoplastic composite and then molding or extruding the pellets to form articles. In these embodiments of the invention, a first-pass method can be used whereby the components (cellulosic fibers, copolymer, optional elastomeric polymers, and any optional additives) are gravity fed into an extruder and pellets of a homogeneous composition are formed.

In some embodiments, it is necessary to include a second pass that begins with already homogeneous pellets of relatively uniform size. Property and output rate fluctuations due to imperfect mixing are largely eliminated when the pellets are melted and re-extruded in a second pass.

In the embodiments of the invention utilizing the cellulosic fiber-thermoplastic composite in pellet form, the manufacture of the pellet can include two steps, a blending step, as described above, and a pelletizing step.

In embodiments of the invention, the copolymer and cellulosic fiber can be dry blended in appropriate proportions prior to introduction into blending equipment. The blending steps can occur in separate powder handling equipment or the copolymer fiber streams can be simultaneously introduced into the mixing station at appropriate feed ratios to ensure appropriate product composition.

In some embodiments of the invention, the cellulosic fiber is placed in a hopper, controlled by weight or by volume, to proportion fiber into the mixer. The copolymer is introduced into a resin input system. The amount of copolymer and fiber can be adjusted to ensure that the composite material contains appropriate proportions on a weight or volume basis. The fibers can be introduced into an extrusion device that can include a mixing section, a transport section and a melt section. Each section typically has a desired heat profile resulting in a useful product. The materials can be introduced into the extruder at a rate of about 100 to about 1000 pounds of material per hour and can be initially heated to a temperature that can maintain an efficient melt flow of copolymer. A multistage device can be used that profiles processing temperature to efficiently combine copolymer and fiber. The final stage of extrusion can include a head section. The head sections can contain a circular distribution (6-8" diameter) of 10 to 500 or more, in many cases 20 to 250 orifices having a cross-sectional shape leading to the production of a regular cylindrical pellet. As the material is extruded from the head it is cut with a double-ended knife blade at a rotational speed of about 100 to 400 rpm resulting in the desired pellet length.

In some embodiments of the invention, the pellets, which in some cases are partially foamed during formation, can be placed in a mold, heated to cause further reaction between the copolymer and cellulosic fiber resulting in further expansion and fusion of the expanded pellets to form a foamed mass in the shape of the mold.

In other embodiments of the invention, the pellets can be placed in an extruder as described above and extruded to form a foamed article as described herein.

The cellulosic fiber-thermoplastic composite of the invention may also be used in other forming processes, i.e., injection molded structural foam processes, injection molding, compression molding, co extrusion, and blow molding or via extrusion methods for film or sheet, and thermoforming for producing parts such as those described herein.

Figure 4:
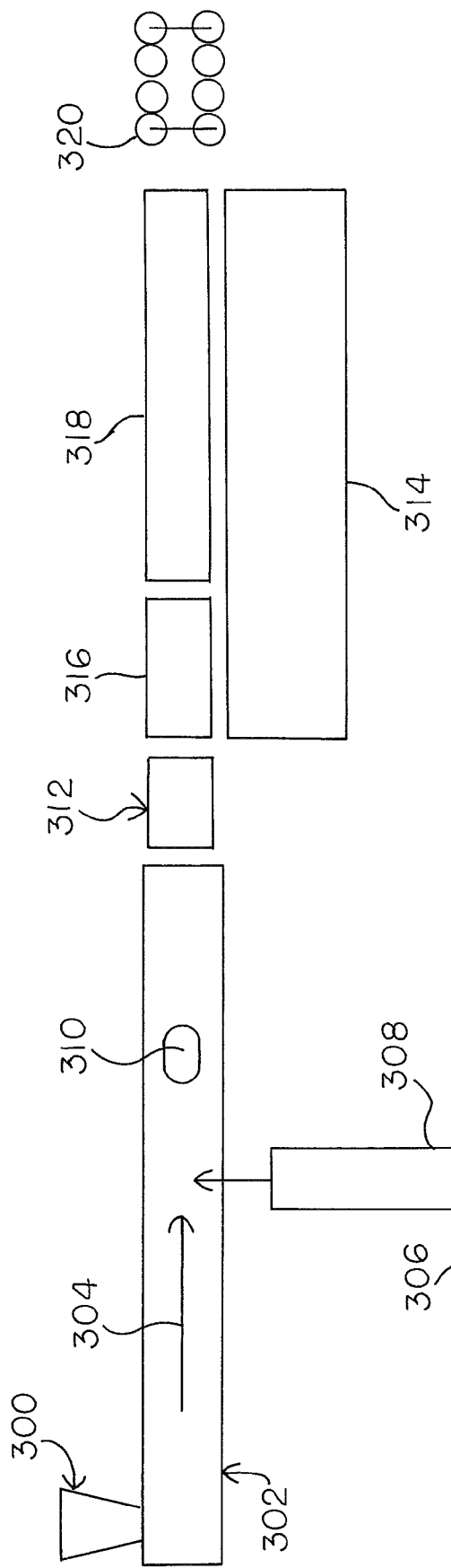
FIG. 4 is a schematic of an extrusion process that can be used in embodiments of the invention.

In embodiments of the invention shown in FIG. 4, the dried cellulosic fiber is fed via wood hopper 300 to a twin screw extruder 302, which heats the fiber to temperature while being transported along direction 304. The copolymer is fed via polymer hopper 306 to single screw extruder 308, in which the copolymer is melted and fed to twin screw extruder 302, where the molten copolymer and cellulosic fiber are mixed. Vent 310 can optionally be included along twin screw extruder 302 to allow excess water vapor to be removed from the cellulosic fiber-copolymer mixture. The mixture exits twin screw extruder 302 through profile die 312, where the mixture is generally shaped. The mixture exits profile die 312 and foams to fill the dimensions of shaping section 316 of calibration table 314, which can utilize vacuum to ensure that the cellulosic fiber-copolymer mixture foams to the desired profile shape. While optionally continuing the application of vacuum a cooling section 318 of calibration table 314 is immersed in a water bath, or other suitable cooling means (refrigerant, heat exchanger, etc.) where the temperature of the cellulosic fiber-copolymer mixture is brought below its melting point so that the cellular structure is maintained and the occurrence of sinks or other surface imperfections is minimized. After exiting calibration table 314, the extruded foamed cellulosic fiber-copolymer mixture is pulled through a traveling cut-off saw 320 and to a run-off table (not shown).

In particular embodiments of the invention, the equipment that can be used in the present methods as shown in FIG. 4 can include a WT-94 WOODTRUDER® system, which can include a GP94 94 mm counter-rotating parallel twin-screw extruder (28:1 L/D) with a coupled Mark V® 75 mm single screw extruder. The feed system can include three gravimetric feeders (Colortronics Systems AG, Hunzenschwil, Switzerland) supplying the 75 mm single screw extruder via flood feeding and three Colortronics gravimetric feeders supplying the 94 mm twin screw extruder via starvation feeding. The side feeding of melt polymer in this system has advantages for creating an efficient foaming mechanism. First, a relatively low melt temperature and/or Tg, which is favorable for controlling foaming and cell growth, affects cell size distribution and cell density. Second, premature foaming in the middle of the extruder can be prevented, since the nucleation of foaming begins at the exit of the extrusion barrel after thermal mixing with the cellulosic fibers and the copolymer melt.

In embodiments of the invention, the melt temperature and/or Tg of the copolymer can be from about 204° C. to about 260° C. according to the particular process used. In some embodiments of the invention, the sequential barrel zone temperatures of the 75 mm single screw extruder can be set at 250° C., 240° C., 220° C., 210° C., and 205° C. respectively. Within these conditions, the copolymer melt can be fed to the 94 mm twin screw extruder with good flowability. The melt temperature and/or Tg of the copolymer fed from the single screw extruder can be from about 200° C. to about 205° C. In order to control foaming, the melt temperature is typically kept as low as possible within the ranges of temperature that assure sufficient melt flow. In some embodiments, the copolymer melt temperature can be maintained as low as 204° C. at a melt pressure of about 900 psi. Cellulosic fibers can be fed into the twin screw extruder and heated up to about 175° C. for several minutes by the hot extruder barrel and the moisture from wood flour is efficiently removed through atmospheric and vacuum venting zones. The melt temperature of mixture of copolymer and cellulosic fiber can range from about 170° C. to about 185° C. at a melt pressure of the mixture of about 700 psi.

In embodiments of the invention, the melt pressure at the barrel end of twin screw extruder can range from about 560 psi to about 760 psi. In many embodiments, the pressure is not kept constant since it can be sensitive to the rotational cycle of the extruder screws.

In embodiments of the invention, the output rate of the extrusion can be about 152.5 lbs/hour, which can include about 90 lbs/hour of cellulosic fiber, about 55 lbs/hour of copolymer, and about 7.5 lbs/hour of lubricant. The output rate can be moderated in order to provide longer cooling times for the extrudate. When the output rate is too fast, the line speed is faster and the extrudate cooling time is shorter.

In embodiments of the invention, vacuum is applied to vent the mixture. Any excess moisture in the cellulosic fiber can result in poor surfaces with swelling and openings. In many embodiments, vacuum venting can be used to control the degree of foaming since the amount of the active blowing agent can be controlled by the amount of vacuum.

Figure 5:
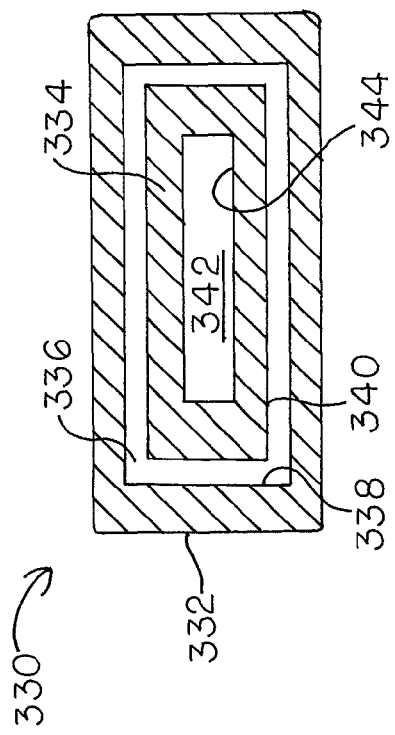
FIG. 5 is a front elevation view of a profile die that can be used in embodiments of the invention.

In embodiments of the invention, profile die 312 of FIG. 4 can be die 330 as shown in FIG. 5, a Celuka-type die, which includes outer shell 332 and inner shell 334. Casing die 336 is defined by the space between inner surface 338 of outer shell 332 and outer surface 340 of inner shell 334. Central die 342 is defined by the space formed by inner surface 344 of inner shell 334.

Figure 6:
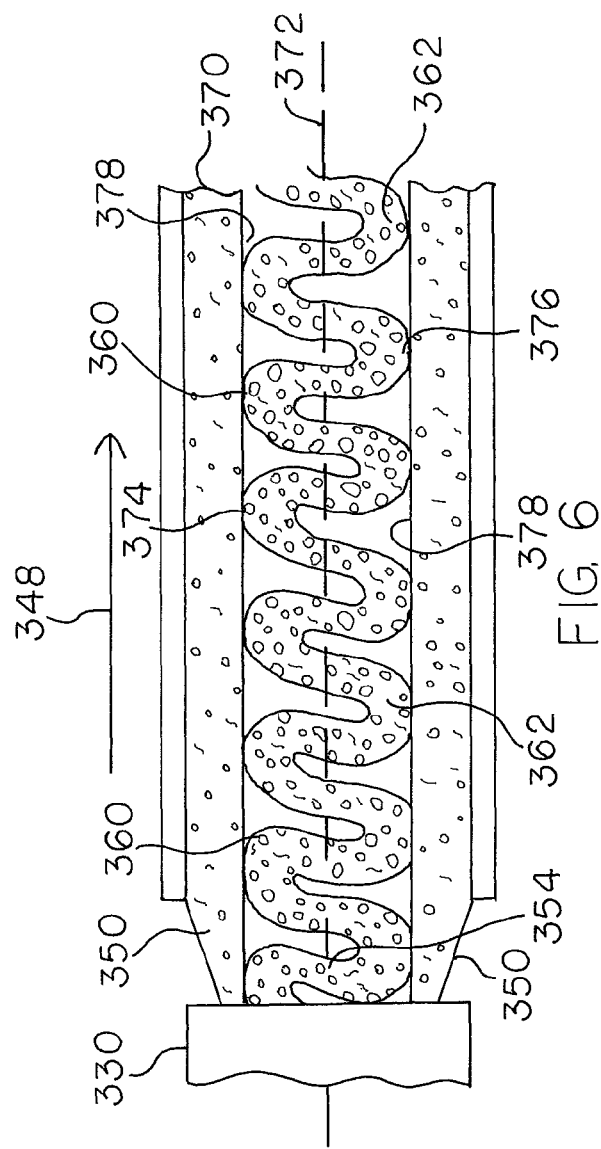
FIG. 6 is a side elevation sectional view of the extrusion of a foamed cellulosic fiber-thermoplastic composite article provided by some embodiments of the invention.
Figure 7:
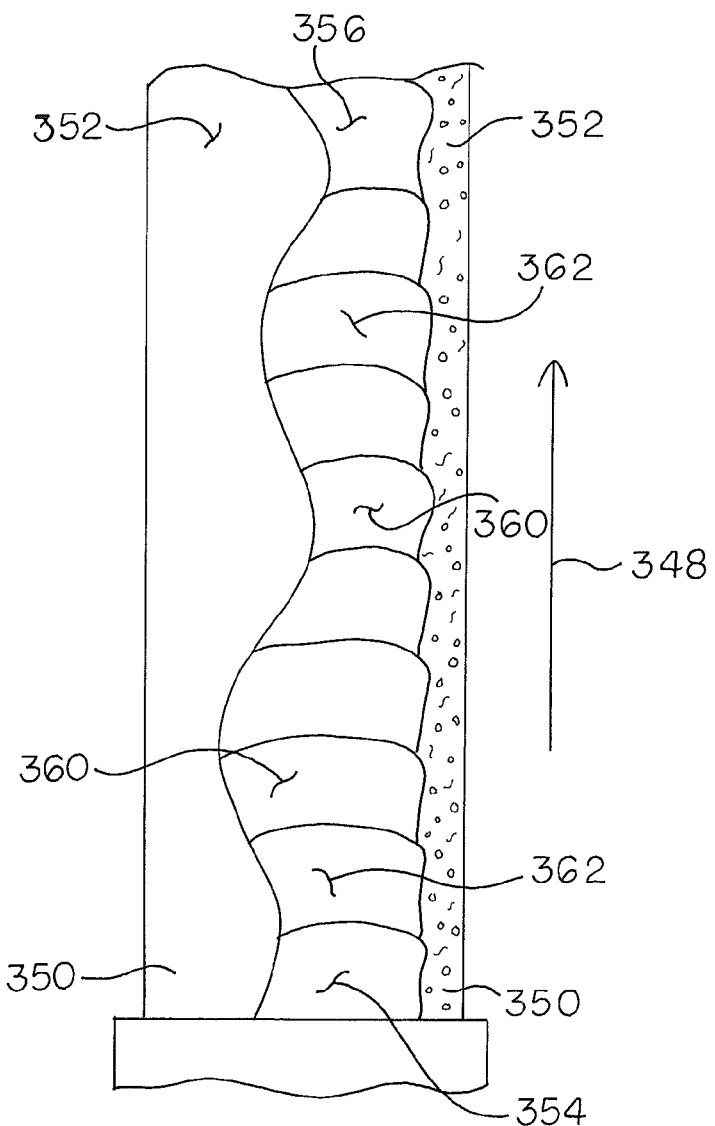
FIG. 7 is a top plan view of the extrusion of a foamed cellulosic fiber-thermoplastic composite article provided by some embodiments of the invention.
Figure 8:
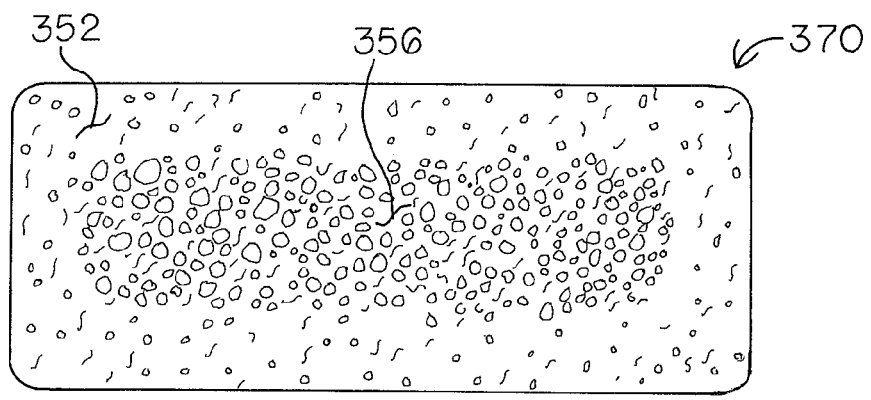
FIG. 8 is a cross-sectional view of an extruded foamed cellulosic fiber-thermoplastic composite article provided by some embodiments of the invention.

In embodiments of the invention shown in FIGS. 6-8, the extruded cellulosic fiber-copolymer mixture exits die 330 in direction 348 in two streams. First stream 350 exits die 330 through casing die 336 to form an outer casing or shell 352, which is generally micro foamed as described above. Second stream 354 exits central die 342 and is encased by first stream 350 and forms central foam 356, which is structured foam in nature as described herein.

In the embodiments of FIGS. 6-8, while first stream 350 generally travels along direction 348 in a linear fashion with some expansion, second stream 354 travels in a sinusoidal fashion along direction 348 eventually expanding to fill the space within outer casing or shell 352. The sinusoidal aspect of second stream 354 is shown in FIGS. 6 and 7 where successive peaks 360 and troughs 362 become thicker due to the foaming reaction as the cellulosic fiber-copolymer mixture travels along direction 348. Unique to this embodiment of the invention is that, while second stream 354 eventually foams to fill the space within outer casing or shell 352 as central foam 356, the flow patterns and cellulose-copolymer reaction "lock" the cellulosic fibers into various orientations.

Referring to FIG. 6, the resulting encased sinusoidal foam structure includes outer casing 352 encompassing the outer cross-sectional surface of extruded article 370 and central foam 356 as the interior portion, which has a lower density than outer casing 352. Central foam 356 has a wave-like structure in extrusion direction 348 oscillating about midpoint 372 of article 370. Peak deviations 374 and 376 from mid-point 372 are in contact with and fused to inner portion 378 of outer casing 352.

Referring to FIGS. 6-8, the cellulosic fibers in outer casing or shell 352 are generally oriented with extrusion direction 348. On the other hand, the cellulosic fibers in central foam 356 have a changing orientation along the wave-like structure of article 370, which follows the sinusoidal pattern. This cellulosic fiber orientation contributes to a number of the properties of the thermoplastic composite materials described herein.

Figure 9:
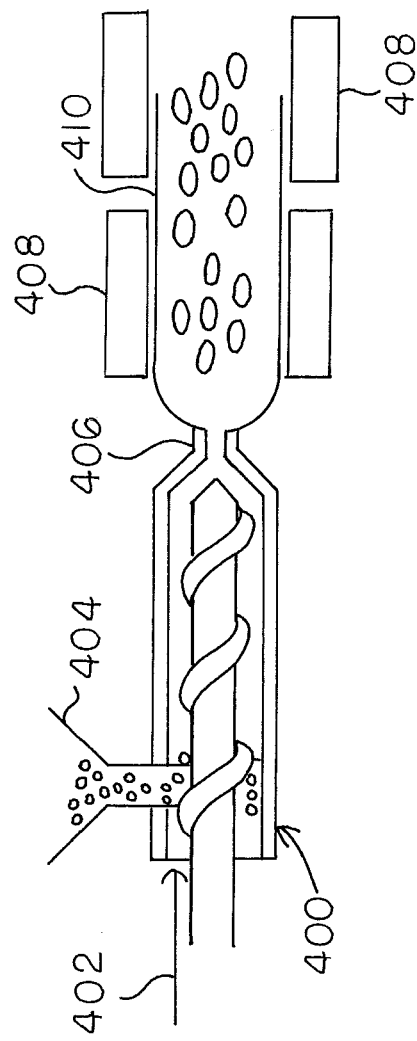
FIG. 9 is a schematic of an extrusion process that can be used in embodiments of the invention.

In the embodiments of the invention shown in FIG. 9, a free foaming die can be used. As an example of these embodiments, extruder 400 transports cellulosic fiber along direction 402 and it is mixed with copolymer, which is added to extruder 400 via hopper 404. The copolymer-cellulosic fiber mixture passes through die 406 into temperature controlled sizing sleeves 408, which include calibration tube 410, and reside in a vacuum cooling tank containing water. In this embodiment, the land thickness of die 406 is typically constant. In this free foaming embodiment, foaming of the copolymer-cellulosic fiber mixture begins after the end of die 406, or, in other words, outside of die 406. The thermoplastic composite materials produced according to this method have a variable expansion ratio, are generally low density and have a good outer surface.

Figure 10:
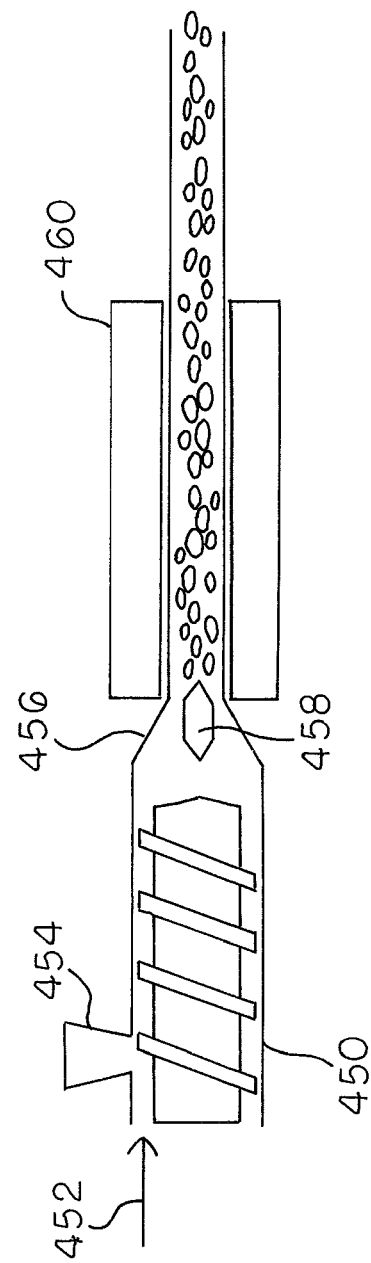
FIG. 10 is a schematic of an extrusion process that can be used in embodiments of the invention.

In another embodiment of the invention shown in FIG. 10, a Celuka-type foaming die can be used. In this embodiment, extruder 450 transports cellulosic fiber along direction 452 and it is mixed with copolymer, which is added to extruder 450 via hopper 454. The copolymer-cellulosic fiber mixture passes through sizing and cooling die 456, which includes fixed torpedo 458 in the center of die 456. The foamed copolymer-cellulosic fiber mixture is cooled in take off section 460. The thermoplastic composite materials produced according to this method have a hard outer surface, medium density, a fixed expansion ratio and good strength due to the presence of dual layers.

In a particular embodiment of the invention, the Celuka-type foaming die is used in an inward foaming processes. In this method the calibration unit is situated adjacent to the die and has the same dimensions as the die, which helps control foam expansion. This process provides very rapid cooling. Bubble formation is quenched in the surface of the product and a solid outer skin is produced. As a result of the dual layers, the foamed extrudate generally shows good mechanical properties. Compared with the free foaming method of FIG. 9, the Celuka-type process, shown in FIG. 10 provides a different cell structure and density profile.

The material produced through a free foaming die has a higher density skin (similar to the outer portion 204 of FIG. 2 or outer casing or shell 352 of FIG. 8) at each edge (about 900 to about 1100 kg/m$^3$, in some cases about 950 to about 1050 kg/m$^3$) and the density quickly drops off at about 3 to about 20, in some cases at about 5 to about 15 percent of the overall thickness of the article to a lower density central core portion (similar to the central portion 202 of FIG. 2 or central portion 356 of FIG. 8) that has a lower density than the higher density skin (about 450 to about 650 kg/m$^3$, in some cases about 500 to about 600 kg/m$^3$).

The material produced through a Celuka-type die has a higher density layer (similar to the outer portion 204 of FIG. 2 or outer casing or shell 352 of FIG. 8, but typically thicker than the free foaming die higher density skin) at each edge (about 1200 to about 1600 kg/m$^3$, in some cases about 1300 to about 1500 kg/m$^3$) and the density quickly drops off at about 5 to about 22, in some cases at about 7 to about 18 percent of the overall thickness of the article to a lower density central core portion (similar to the central portion 202 of FIG. 2 or central foam 356 of FIG. 8, but typically having larger cells than the central core of the free foaming die material) that has a lower density than the higher density skin (about 250 to about 450 kg/m$^3$, in some cases about 300 to about 400 kg/m$^3$). The most central portion (about 35% to about 70%, in some cases about 40% to about 60% from the edge of the article) has the lowest density in the article (about 100 to about 300 kg/m$^3$, in some cases about 150 to about 250 kg/m$^3$). In many cases, a transition zone exists between the higher density layer, lower density central core portion and most central portion.

In particular embodiments of the invention, the Celuka-type foaming die can be foaming dies manufactured by Futuresoft Technologies Inc., Manalapan, N.J. In this embodiment, there are three nozzle units located at the die wall and a center mandrel. The three melt flows from different nozzles combine at the die and the pressure drop initiates foaming. The foaming cells grow rapidly until the polymer melt is recrystallized by the effect of cooling by a calibrator unit, which may be a sizing die equipped with cold water channels. Higher density outer portions or skin layers can be formed at the edges or outer surface of the extrudate due to the relatively high cooling rate of the extrudate surface in direct contact with the die wall and calibrator units. The foaming die shown in FIG. 5 is an example of one that can be adapted to be used in this embodiment of the invention.

Figure 11:
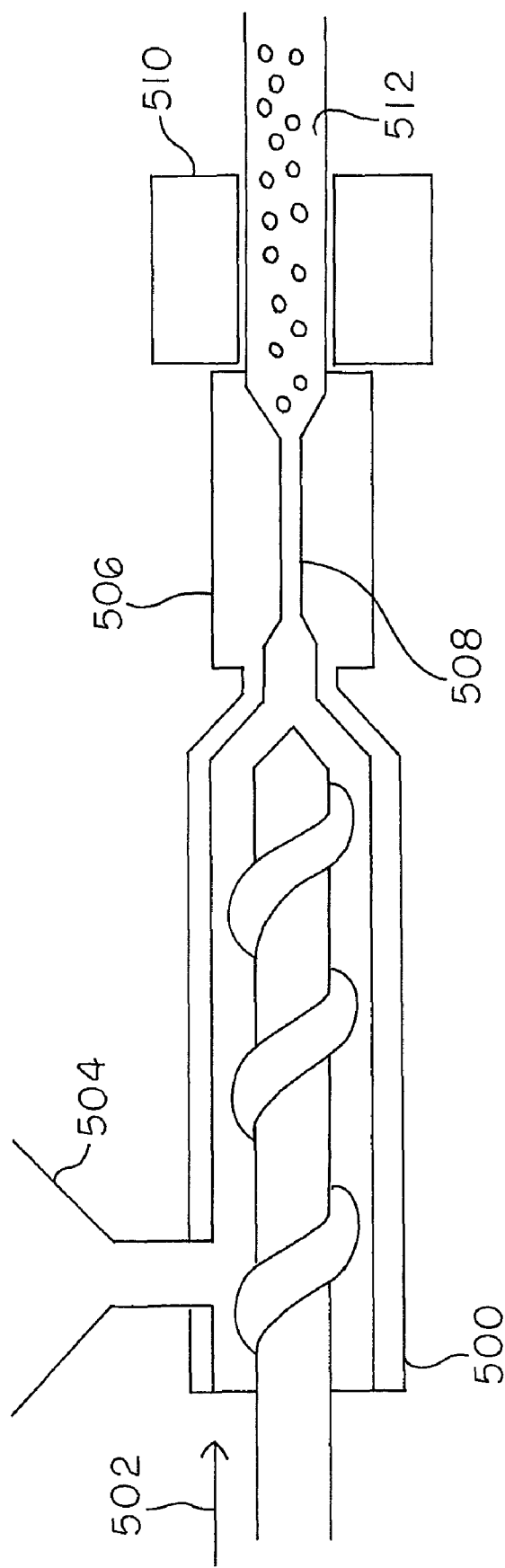
FIG. 11 is a schematic of an extrusion process that can be used in embodiments of the invention.

In an additional embodiment shown in FIG. 11, extruder 500 transports cellulosic fiber along direction 502 and it is mixed with copolymer, which is added to extruder 500 via hopper 504. The copolymer-cellulosic fiber mixture passes through foaming die 506, which includes nozzle 508, which maximizes the pressure drop. As opposed to the free foaming embodiment of FIG. 9, in this embodiment, foaming of the copolymer-cellulosic fiber mixture begins inside of die 506, typically in a micro foamed fashion as described above. Foamed copolymer-cellulosic fiber mixture 512 enters calibrator 510, where it is sized and cooled for take off. The methods according to this embodiment provide thermoplastic composite materials with a higher cell density and larger expansion ratio.

The nozzle foaming die system of FIG. 11 generally provides a microcellular foaming mechanism. The nozzle is relatively thinner than many foaming dies and is meant to keep the melt pressure as high as possible, resulting in a large pressure drop at the end of the nozzle. The system in this embodiment provides good nucleation initiation resulting in an increased cell density (number of cells per unit volume).

In embodiments of the invention, a system of water cooling tanks can be placed after the calibration units to maintain extrudate cooling until stable dimensions of the products are achieved. The system of water tanks can include stainless steel plates with thick epoxy side walls, top windows, and water circulation pipes.

In particular embodiments of the invention, the water cooling tank can be about 48 inches long, 24 inches wide and 13.5 inches deep.

It should be noted that the length of the calibration units or number of calibrator units will be varied based on the cooling rate desired. In general for wood plastic composite production, three calibration units may be needed for an efficient extrusion output rate.

In embodiments of the invention, the extrudate can be cooled in the water tank and can be introduced to a water spray tank for further cooling. At the end of the water spray tank, an air knife can be employed to remove water droplets from the extrudate surfaces so that the puller, a haul-off machine, can efficiently haul the extrudate off without significant slippage.

The hauling-off rate of extrudate at the puller can be used to control the expansion rate of the foaming extrudate and aid in providing streamlined, smooth flow extrusion.

In embodiments of the invention, the puller can be those available from Royal Machine Manufacture Ltd.

After being extruded, shaped and formed, the article can have a thickness of at least about 0.1, in some instances at least about 0.15, in other instances at least about 0.25, in some cases at least about 0.5 and in other cases at least about 1 cm and can have a thickness of up to about 35, in some instances up to about 30 cm, in other instances up to about 25 cm, in some situations up to about 20 cm, in other situations up to about 15, in some cases up to about 12 cm, and in other cases up to about 10 cm. The thickness of the article can be any value or range between any of the values recited above.

Referring to FIGS. 2 and 8, the small voids in the micro foamed material (for example, outer portion 204 or outer casing or shell 352) can have a diameter of at least 0.01, in some cases at least 0.1 and in other cases at least 1 μm and can be less than 50, in some cases up to 49, in other cases up to 45, in some instances up to 40, in other instances up to 35, in some situations up to 30 and in other situations up to 25 μm. The size of the small voids in the micro foamed material will vary based on the composition of the copolymer, the type of cellulose and the particular extrusion conditions employed. The size of the small voids in the micro foamed material can be any value or range between any of the values recited above.

In embodiments of the invention, the density of the micro foamed material (for example outer portion 204 or outer casing or shell 352) can be at least 0.6, in some cases at least 0.64 and in other cases at least 0.68 g/cm$^3$ and can be up to 1.1, in some cases up to 1.06 and in other cases up to 1.02 g/cm$^3$. In particular aspects of the invention and depending on any additional fillers that may be used, the density of the micro foamed material can be up to 1.3 and in some cases up to 1.2 g/cm$^3$. The density of the micro foamed material will vary based on the composition of the copolymer, the type of cellulose, types of fillers and the particular extrusion conditions employed. The density of the micro foamed material can be any value or range between any of the values recited above.

The large voids in the structured foamed material (for example central portion 202 of FIG. 2 or central foam 356 of FIG. 8) can have a diameter of at least 50, in some cases at least 55 and in other cases at least 60 μm and can be up to 2,500, in some cases up to 2,000, in other cases up to 1,500, in some instances up to 1,000, in other instances up to 500, in some situations up to 400 and in other situations up to 250 μm. The size of the large voids in the structured foamed material will vary based on the composition of the copolymer, the type of cellulose and the particular extrusion conditions employed.

The size of the large voids in the structured foamed material can be any value or range between any of the values recited above.

In embodiments of the invention, the density of the structured foamed material is less than the density of the micro foamed material. In aspects of this embodiment, the structured foamed material (for example central portion 202 of FIG. 2 or central foam 356 of FIG. 8) can be at least 0.45, in some cases at least 0.50 and in other cases at least 0.55 g/cm$^3$ and can be up to 0.80, in some cases up to 0.75 and in other cases up to 0.7 g/cm$^3$. The density of the structured foamed material will vary based on the composition of the copolymer, the type of cellulose and the particular extrusion conditions employed. The density of the structured foamed material can be any value or range between any of the values recited above.

A particular advantage of the present cellulosic fiber-thermoplastic composite over prior art wood fiber and/or wood four filled polyolefins is the superior tensile and thermal properties of the present cellulosic fiber-thermoplastic composite.

In embodiments of the invention, the tensile modulus of the present cellulosic fiber-thermoplastic composite, determined according to ISO 527-2, is greater than 2,000, in some cases greater than 2,500 and in other cases greater than 3,000 MPa, depending on the particular thermoplastic and cellulosic fiber that is used.

In additional embodiments of the invention, the tensile strength, determined according to ISO 527-2, of the cellulosic fiber-thermoplastic composite can be at least about 25, in some cases at least about 30, in other cases at least about 35 and in some instances at least about 40 MPa depending on the particular thermoplastic and cellulosic fiber that is used.

In particular embodiments of the invention, the cellulosic fiber-thermoplastic composite of the invention has a tensile modulus, determined according to ISO 527-2, that is at least 1.5, in some cases at least 1.75 and in other cases at least 2 times greater than the tensile modulus of a similarly composed material containing cellulosic fiber and polypropylene. Further to this embodiment, the cellulosic fiber-thermoplastic composite of the invention has a tensile strength, determined according to ISO 527-2, that is at least 1.5, in some cases at least 1.75 and in other cases at least 2 times greater than the tensile strength of a similarly composed material containing cellulosic fiber and polypropylene.

In other embodiments of the invention, the deflection temperature under load (DTUL) at 1.82 MPa determined according to ISO-75-2, of the cellulosic fiber-thermoplastic composite is at least about 85° C.

In embodiments of the invention, the flexural properties of the present cellulosic fiber-thermoplastic composite material can be characterized by the modulus of rupture of the material. According to this embodiment, the modulus of rupture determined according to ASTM D 790, is greater than 750, in some cases greater than 900 and in other cases at least 1,000 psi, depending on the particular thermoplastic and cellulosic fiber that is used.

In embodiments of the invention, the flexural properties of the present cellulosic fiber-thermoplastic composite material can be characterized by the modulus of elasticity of the material. According to this embodiment, the modulus of elasticity determined according to ASTM D 790, is greater than 75,000; in some cases greater than 90,000 and in other cases at least 100,000 psi, depending on the particular thermoplastic and cellulosic fiber that is used.

In embodiments of the invention, the flexural properties of the present cellulosic fiber-thermoplastic composite material can be characterized by the modulus of rupture of the material. According to this embodiment, the modulus of rupture determined according to ASTM D 790, is greater than 750, in some cases greater than 900 and in other cases at least 1,000 psi, and in some cases can be up to 20,000 psi depending on the particular thermoplastic and cellulosic fiber that is used.

In embodiments of the invention, the flexural properties of the present cellulosic fiber-thermoplastic composite material can be characterized by the modulus of elasticity of the material. According to this embodiment, the modulus of elasticity determined according to ASTM D 790, is greater than 75,000; in some cases greater than 90,000 and in other cases at least 100,000 psi and in some cases can be up to 1,000,000 psi depending on the particular thermoplastic and cellulosic fiber that is used.

In embodiments of the invention, the tensile properties of the present cellulosic fiber-thermoplastic composite material can be characterized by the modulus of rupture of the material. According to this embodiment, the modulus of rupture determined according to ASTM D 638, is greater than 500, in some cases greater than 650 and in other cases at least 750 psi, and in some cases can be up to 20,000 psi depending on the particular thermoplastic and cellulosic fiber that is used.

In embodiments of the invention, the tensile properties of the present cellulosic fiber-thermoplastic composite material can be characterized by the modulus of elasticity of the material. According to this embodiment, the modulus of elasticity determined according to ASTM D 638, is greater than 100,000; in some cases greater than 125,000 and in other cases at least 150,000 psi and in some cases can be up to 1,500,000 psi depending on the particular thermoplastic and cellulosic fiber that is used.

In embodiments of the invention, the impact properties of the present cellulosic fiber-thermoplastic composite material can be characterized by the Izod impact resistance of the material. According to this embodiment, the Izod impact resistance is determined according to ASTM D 256, is less than 80, in some instances less than 60, in other instances less than 50, in some situations less than 40, in other situations less than 30, in some cases less than 25 and in other cases not more than 22 J/M and in some cases can be as low as 1 J/M depending on the particular thermoplastic and cellulosic fiber that is used.

In embodiments of the invention, the flexural properties of the micro foamed portion of the present cellulosic fiber-thermoplastic composite material are greater than that of the structured foam portion as characterized by the modulus of rupture of the material determined according to ASTM D 790. In this embodiment of the invention, the structured foam portion can have a modulus of rupture that is greater than 750, in some cases greater than 900 and in other cases at least 1,000 psi and can be up to 10,000 psi, depending on the particular thermoplastic and cellulosic fiber that is used. In this embodiment, the micro foam portion can have a modulus of rupture that is greater than 1,000, in some cases greater than 1,150 and in other cases at least 1,300 psi and can be up to 20,000 psi, depending on the particular thermoplastic and cellulosic fiber that is used.

In embodiments of the invention, the flexural properties of the micro foamed portion of the present cellulosic fiber-thermoplastic composite material are greater than that of the structured foam potion as characterized by the modulus of elasticity of the material determined according to ASTM D 790. In this embodiment of the invention, the structured foam portion can have a modulus of rupture that is greater than 75,000; in some cases greater than 90,000 and in other cases at least 100,000 psi and can be up to 700,000 psi depending on the particular thermoplastic and cellulosic fiber that is used. In this embodiment, the micro foam portion can have a modulus of elasticity that is greater than 100,000, in some cases greater than 125,000 and in other cases at least 150,000 psi and can be up to 750,000 psi, depending on the particular thermoplastic and cellulosic fiber that is used.

In embodiments of the invention, the tensile properties of the micro foamed portion of the present cellulosic fiber-thermoplastic composite material are greater than that of the structured foam potion as characterized by the modulus of rupture of the material. In this embodiment of the invention, the structured foam portion can have a modulus of rupture determined according to ASTM D 638, that is greater than 500, in some cases greater than 650 and in other cases at least 750 psi, and in some cases can be up to 10,000 psi depending on the particular thermoplastic and cellulosic fiber that is used. In this embodiment, the micro foam portion can have a modulus of rupture that is greater than 1,000, in some cases greater than 1,250 and in other cases at least 1,500 psi and can be up to 20,000 psi, depending on the particular thermoplastic and cellulosic fiber that is used.

In embodiments of the invention, the tensile properties of the micro foamed portion of the present cellulosic fiber-thermoplastic composite material are greater than that of the structured foam potion as characterized by the modulus of elasticity of the material. In this embodiment of the invention, the structured foam portion can have a modulus of elasticity determined according to ASTM D 638 that is greater than 100,000; in some cases greater than 125,000 and in other cases at least 150,000 psi and in some cases can be up to 1,500,000 psi depending on the particular thermoplastic and cellulosic fiber that is used. In this embodiment, the micro foam portion can have a modulus of elasticity that is greater than 200,000, in some cases greater than 225,000 and in other cases at least 250,000 psi and can be up to 2,000,000 psi, depending on the particular thermoplastic and cellulosic fiber that is used.

In embodiments of the invention, the Izod impact properties of the micro foamed portion of the present cellulosic fiber-thermoplastic composite material are higher than that of the structured foam potion as characterized by the Izod impact resistance of the material. In this embodiment of the invention, the structured foam portion has a lower Izod impact resistance determined according to ASTM D 256 that is less than 30, in some cases less than 25 and in other cases not more than 22 J/M and in some cases can be as low as 1 J/M depending on the particular thermoplastic and cellulosic fiber that is used. In this embodiment of the invention, the micro foam portion can have an Izod impact resistance determined according to ASTM D 256 that is less than 50, in some cases less than 40 and in other cases not more than 35 J/M and in some cases can be as low as 1 J/M depending on the particular thermoplastic and cellulosic fiber that is used.

In an embodiment of the invention shown in FIG. 3, the extruded article can be a synthetic board 1, which can include a blend of the copolymer and elastomeric polymer, a plurality of cellulosic fibers 6 compounded with a blend to form a cellulosic fiber-thermoplastic composite 4. Board 1 has a width 3, a thickness 7, and a side 5. Board 1 can be used as a decking component or any other suitable building material. For example, as shown in FIG. 3, board 1 can be used as a decking board, railing, railing post, and/or decking beam. In another example, board 1 can be used to construct any portion of homes, walkways, shelters, and/or any other desirable structure.

Width 3 of board 1 can be at least about 1 cm, in some cases at least about 2 cm and in other cases at least about 4 cm and can be up to about 250 cm, in some cases up to about 244 cm, in other cases up to about 215 cm, in some instances up to about 185 cm and in other instances up to about 125 cm. Width 3 can be any value or range between any of the values recited above.

Thickness 7 of board 1 can be at least 1 cm, in some cases at least about 2 cm and in other cases at least about 4 cm and can be up to about 12, in some cases up to about 11, and in other cases up to about 10 cm. Thickness 7 of board 1 can be any value or range between any of the values recited above.

Side 5 of board 1 can be extruded to any desired length. In embodiments of the invention, board 1 is extruded to a commercially useful length of side 5 of board 1, which can be at least about 5, in some cases at least about 10, in other cases at least about 20, and in some instances at least about 25 cm long and can be up to about 1,000, in some cases up to about 625, in other cases up to about 475, and in other instances up to about 375 cm. The length of side 5 of board 1 can be any value or range between any of the values recited above.

In embodiments of the invention, the cellulosic fiber-thermoplastic composite boards can have panel-type dimensions, as a non limiting example, about 2 to about 8 feet wide, about 6 to about 12 feet long and about 0.5 to about 4 inches thick. In this embodiment, the cellulosic fiber-thermoplastic composite panel can be attached to studs or joists to form a surface for a wall, a floor or a roof.

In aspects of the invention, the density of the cellulosic fiber-thermoplastic composite article is less than 1 g/cm$^3$ and the articles are useful in marine applications. The present articles are particularly suited for marine applications because their density is less than that of water, providing desired buoyancy as well as providing a material that is very resistant to microbial attack.

The present invention will further be described by reference to the following examples. The following examples are merely illustrative of the invention and are not intended to be limiting. Unless otherwise indicated, all percentages are by weight unless otherwise specified.

EXAMPLES

The following equipment was used in processing the examples described below.

Extrusion processing was carried out using a WT-94 WOODTRUDER® extruder using a 94 mm counter-rotating parallel twin-screw extruder (T94, 28:1 L/D) with a coupled Mark V® 75 mm single-screw extruder (T75) available from Davis-Standard Corporation, Pawcatuck, Conn.

Gravimetric feeders (Colortronic North America, Inc., Flint, Mich.) were used to supply the extruders.

Styrene-Maleic Anhydride (SMA) resins used were DYLARK® 238, resin, DYLARK® 332 resin and DYLARK® 378 resin available from NOVA Chemicals Inc., Pittsburgh, Pa.

Cellulosic fiber used was 40 mesh pine sawdust available from American Wood Fibers, Inc., Schofield, Wis.

Lubricant was EPOLENE® wax (EW) available from Eastman Chemical Company, Kingsport, Tenn. or STRUKTOL® fatty acid ester (FA) available from Schill & Seilacher GmbH, Hamburg, Germany.

Examples 1-5

Wood filled SMA samples were prepared using a free foaming die and the combinations of ingredients in the following table. All values are weight percentages.

| Example No. | SMA Resin type | SMA | Cellulosic fiber | Lubricant (EW) |
|---|---|---|---|---|
| 1 | 332 | 70 | 25 | 5 |
| 2 | 332 | 69 | 25 | 6 |
| 3 | 378 | 78 | 18 | 4 |
| 4 | 378 | 70 | 25 | 5 |
| 5 | 378 | 64 | 30 | 6 |

The following extrusion parameters were used to prepare each of Examples 1-5.

| Parameter | Mark V® extruder | WOODTRUDER® Extruder (T94) |
|---|---|---|
| Barrel Zone 1 (° C.) | 250 | 30 |
| Barrel Zone 2 (° C.) | 240 | 230 |
| Barrel Zone 3 (° C.) | 220 | 225 |
| Barrel Zone 4 (° C.) | 210 | 220 |
| Barrel Zone 5 (° C.) | 205 | 210 |
| Barrel Zone 6 (° C.) | — | 205 |
| Barrel Zone 7 (° C.) | — | 205 |
| Barrel Zone 8 (° C.) | — | 200 |
| Melt (° C.) | 205 | — |
| Adapter (° C.) | 220 | 220 |
| Clamp (° C.) | 220 | 220 |
| Pressure (psi) | 1600-1700 | 25-100 |
| Load (%) | 46 | 19 |
| Screw Speed (rpm) | 37 | 24 |

During the extrusion process, a blowing agent was generated, believed to be either water, carbon dioxide, or a combination thereof, resulting from reaction of the anhydride groups of the SMA and the hydroxyl groups of the cellulosic fiber. The blowing agent caused a foam structure to form in the extruded parts. Although the foaming was not well controlled, the parts were characterized as having a foam center and generally solid exterior surface.

FIGS. 1 and 2 depict extruded parts that were produced in Examples 1-5. Although they differ in the extent of foaming based on the particular compositions used, each extruded article had a structured foamed center, characterized as having cell walls 202, and void spaces 214, defined by walls 202 and a micro foamed solid exterior portion 204.

The extruded parts were approximately rectangular in cross-section with dimensions of about 1.22 inches (3.1 cm) by about 5.35 inches (13.6 cm).

Samples for testing were typically obtained from the structured foamed center portion (IN) and exterior micro foamed portion 204 (OUT) of each extruded sample. Typical densities of the various samples are shown in the table below.

| Sample | Density (g/cm$^3$) |
|---|---|
| Example 1 IN | 0.59 |
| Example 1 OUT | 0.97 |
| Example 2 IN | 0.61 |
| Example 2 OUT | 1.02 |
| Example 3 IN | 0.57 |
| Example 3 OUT | 0.86 |
| Example 4 IN | 0.59 |
| Example 4 OUT | 0.79 |
| Example 5 IN | 0.60 |
| Example 5 OUT | 0.68 |

Flexural bending tests were conducted in accordance with ASTM D 790 "Standard Test Methods for Flexural Properties of Unreinforced and Reinforced Plastics and Electrical Insulating Materials" on samples from Examples 1-5. Modulus of Rupture (MOR) and Modulus of Elasticity (MOE) results appear in the following table (average value from 3-5 tests).

| Sample | MOR (psi) | MOE (psi) |
| --- | --- | --- |
| Example 1 IN | 2,000 | 254,000 |
| Example 1 OUT | 3,700 | 435,000 |
| Example 2 IN | 1,300 | 174,000 |
| Example 2 OUT | 5,000 | 595,000 |
| Example 3 IN | 1,500 | 127,000 |
| Example 3 OUT | 3,000 | 291,000 |
| Example 4 IN | 1,100 | 111,000 |
| Example 4 OUT | 2,700 | 290,000 |
| Example 5 IN | 1,000 | 104,000 |
| Example 5 OUT | 1,400 | 151,000 |

The data show the excellent flexural strength and modulus properties of the extruded samples prepared according to the present invention.

Test samples were also obtained and evaluated according to ASTM D 638 "Standard Test Method for Tensile Properties of Plastics." Dog bone specimens of ¾" width and ½" thickness were tested using a 2-kip INSTRON® Universal Tester (Instron Corporation, Canton, Mass.) at a rate of 0.2 inch/min. Modulus of Rupture (MOR) and Modulus of Elasticity (MOE) results appear in the following table (average value from 3-5 tests).

| Sample | MOR (kgf/cm$^2$) | MOE (kgf/cm$^2$) |
| --- | --- | --- |
| Example 1 IN | 60 | 24,250 |
| Example 1 OUT | 170 | 58,500 |
| Example 2 IN | 110 | 45,300 |
| Example 2 OUT | 160 | 65,800 |
| Example 3 IN | 120 | 14,700 |
| Example 3 OUT | 150 | 41,000 |
| Example 4 IN | 170 | 11,500 |
| Example 4 OUT | 120 | 32,600 |
| Example 5 IN | 110 | 12,500 |
| Example 5 OUT | 120 | 13,000 |

The data show the excellent tensile strength and modulus properties of the extruded samples prepared according to the present invention.

Samples from Examples 1-5 were evaluated for thermal expansion properties according to ASTM D 696 "Standard Method for Coefficient of Linear Thermal Expansion of Plastics Between −20° C. and 20° C." Five samples (IN and OUT as described above) were cut from both the transverse axis (opposite axis of extrusion, X) and lateral axis (with the axis of extrusion, Y) having dimensions width 0.375", height 0.375: and length 2.50". The Coefficient of Thermal Expansion (CTE) i.e., the fractional increase in strain per unit rise in temperature is shown in the following table (average value from 3-5 tests).

| Sample | CTE IN (in/° C.) (×10$^{-5}$) | CTE OUT (in/° C.) (×10$^{-5}$) |
| --- | --- | --- |
| Example 1 X | 5.83 | 5.95 |
| Example 1 Y | 5.35 | 4.01 |
| Example 2 X | 5.86 | 6.15 |
| Example 2 Y | 5.49 | 4.17 |
| Example 3 X | 7.95 | 8.35 |
| Example 3 Y | 7.09 | 5.86 |
| Example 4 X | 7.95 | 7.66 |
| Example 4 Y | 6.28 | 4.995 |
| Example 5 X | 7.30 | 7.25 |
| Example 5 Y | 6.41 | 5.85 |

The data demonstrate the excellent thermal expansion properties of the extruded articles prepared according to the invention having CTE values ranging from 0.0000401 to 0.0000835 in/° C.

Samples from Examples 1-5 were evaluated impact according to ASTM D 256 "Standard Test Methods for Determining Izod Pendulum Impact Resistance of Plastics." The Izod Impact results are shown in the table below.

| Sample | IZOD Impact (J/m$^2$). |
| --- | --- |
| Example 1 IN | 7.56 |
| Example 1 OUT | 12.86 |
| Example 2 IN | 8.55 |
| Example 2 OUT | 15.10 |
| Example 3 IN | 14.93 |
| Example 3 OUT | 28.12 |
| Example 4 IN | 13.94 |
| Example 4 OUT | 21.14 |
| Example 5 IN | 11.6 |
| Example 5 OUT | 15.43 |

The data demonstrate the excellent IZOD Impact properties of the extruded articles prepared according to the invention.

Examples 6-8

Wood filled SMA samples were prepared using a Celuka-type foaming die available from Futuresoft Technologies Inc., Manalapan, N.J. and the combinations of ingredients in the following table. All values are weight percentages.

| Example No. | SMA Resin type | SMA | Cellulosic fiber | Lubricant (FA) |
| --- | --- | --- | --- | --- |
| 6 | 238 | 60 | 35 | 5 |
| 7 | 238 | 50 | 45 | 5 |
| 8 | 332 | 50 | 45 | 5 |

The following extrusion parameters were used to prepare each of Examples 6-8 at an output rate of 152.5 pounds per hour and extrusion rate or line speed of 12 inches per a minute through the Celuka type foaming die.

| Parameter | T75 | T94 | Die |
| --- | --- | --- | --- |
| Zone 1 (° C.) | 250 | 30 | 190 |
| Zone 2 (° C.) | 240 | 165 | 190 |
| Zone 3 (° C.) | 220 | 175 | 190 |
| Zone 4 (° C.) | 210 | 210 | — |
| Zone 5 (° C.) | 205 | 205 | — |
| Zone 6 (° C.) | — | 200 | — |

-continued

| Parameter | T75 | T94 | Die |
|---|---|---|---|
| Zone 7 (° C.) | — | 195 | — |
| Zone 8 (° C.) | — | 195 | — |
| CD (° C.) | — | — | 150 |
| Melt (° C.) | 202 | 186 | — |
| Adapter (° C.) | 220 | — | 200 |
| Clamp (° C.) | 220 | — | — |
| Pressure (psi) | 1104-1170 | 550-620 | — |
| Load (%) | 30 | 21 | — |
| Screw Speed (rpm) | 20 | 19 | — |

Vacuum venting was applied to control the degree of foaming. At high vacuum, around 30 mm Hg, the foaming tendency was decreased. Improved foaming characteristics were observed when the vacuum was set at about 5 mm Hg.

During the extrusion process, a blowing agent was generated, believed to be either water, carbon dioxide, or a combination thereof, resulting from reaction of the anhydride groups of the SMA and the hydroxyl groups of the cellulosic fiber. The blowing agent caused a foam structure to form in the extruded parts.

A multilayer structure with different densities was produced. The size of the foaming cells varied according to location in the extrudate. The outer or skin layer was rapidly cooled after exiting the die resulting in very small cell formation of about a few hundred microns. However, cell growth inside the core portion of the extrudate continued due to the reaction with the cellulosic fibers and the thickness of the extrudate. The cell size of the foam in the core portion ranged from a few hundred micrometers to a few millimeters. At the skin layer, the foaming cells were relatively small and the cell density was relatively low.

The extruded parts were approximately rectangular in cross-section with dimensions of about 1.22 inches (3.1 cm) by about 5.35 inches (13.6 cm).

The strength of samples from each extrusion were evaluated. The results are shown in the table below.

| Example No. | Flexural Strength (psi) | Flexural Modulus (psi) | Density (g/cc) |
|---|---|---|---|
| 6 | 3689 | 512,632 | 0.93 |
| 7 | 2550 | 418,728 | 0.84 |
| 8 | 2846 | 363,821 | Less than 0.8 |

The data demonstrate the excellent properties of the extruded articles prepared according to the invention.

The present invention has been described with reference to specific details of particular embodiments thereof. It is not intended that such details be regarded as limitations upon the scope of the invention.

What is claimed is:

1. A method of making a foamed cellulosic fiber-thermoplastic composite article comprising:
   A) providing a copolymer composition that includes:
      i) at least about 20 wt. % of a copolymer formed by polymerizing a mixture comprising:
         a) about 51% to about 99.9% by weight of one or more primary monomers,
         b) about 0.1% to about 49% by weight of one or more anhydride containing monomers, and
         c) optionally about 1% to about 25% by weight of one or more other polymerizable monomers; and
      ii) optionally about 0.1% to about 30% by weight of one or more elastomeric polymers based on the weight of the copolymer;
   B) combining about 30% to about 99.9% by weight of the copolymer composition with about 0.01% to about 70% by weight of one or more cellulosic fibers based on the weight of the combination;
   C) applying an amount of heat, mixing energy and pressure sufficient to provide:
      i) mixing of the copolymer composition and the cellulosic fibers;
      ii) reaction of anhydride groups in the copolymer with hydroxyl groups in the cellulosic fibers; and
      iii) production of a blowing agent as a byproduct of the reaction in ii) to provide a foamable mixture of the copolymer composition and the cellulosic fibers; and
   D) forming the foamed article by placing the foamable mixture in a molding or extruding operation;

wherein the foamed article has a structured foam central portion and micro foamed outer portion that surrounds the structured foam portion and has a higher density than the central portion; and
   wherein the micro foamed outer portion comprises from about 5 to about 22 percent of the overall thickness of the article.

2. The method according to claim 1, wherein the foamed article has a density of not more than 1.3 g/cm³.

3. The method according to claim 1, wherein the primary monomers are selected from the group consisting of styrenic monomers and olefinic monomers and combinations thereof.

4. The method according to claim 3, wherein the styrenic monomers are selected from the group consisting of styrene, p-methyl styrene, α-methyl styrene, tertiary butyl styrene, dimethyl styrene, nuclear brominated or chlorinated derivatives thereof and combinations thereof and the olefinic monomers are selected from the group consisting of ethylene; propylene, 1-butene, 1-pentene, 1-hexene, 1-heptene, 1-octene, 1-nonene, 1-decene, 1-dodecene; 2-butene; 2-pentene; 2-hexene; 2-octene; and combinations thereof.

5. The method according to claim 1, wherein the anhydride containing monomers include one or more monomers according to Formulas I and II:

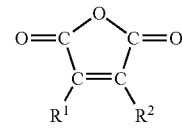

I

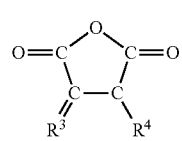

II wherein $R^1$, $R^2$ and $R^4$ are each independently H or a $C_1$-$C_8$ linear, branched or cyclic alkyl or alkenyl radical and $R^3$ is a $C_1$-$C_8$ linear or branched alkyl group.

6. The method according to claim 1, wherein the other monomers are one or more selected from the group consisting of divinylbenzene; conjugated dienes; $C_1$-$C_{12}$ linear, branched or cyclic alkyl mono- or di-esters of maleic acid, fumaric acid and itaconic acid; $C_1$-$C_{12}$ linear, branched or cyclic alkyl esters of acrylic acid, $C_1$-$C_{12}$ linear, branched or cyclic alkyl esters of methacrylic acid; acrylonitrile; methacrylonitrile; and combinations thereof.

7. The method according to claim 1, wherein the weight average molecular weight of the copolymer is from about 20,000 to about 1,000,000.

8. The method according to claim 1, wherein the elastomeric polymers are selected from the group consisting of homopolymers of butadiene or isoprene; random, block, AB diblock, or ABA triblock copolymers of a conjugated diene with a styrenic monomer and/or acrylonitrile; ABS; copolymers of $C_1$-$C_{12}$ linear, branched or cyclic olefins and $C_1$-$C_{12}$ linear, branched or cyclic alkyl esters of (meth)acrylic acid, diblock and triblock copolymers of styrene-butadiene, styrene-butadiene-styrene, styrene-isoprene, styrene-isoprene-styrene, partially hydrogenated styrene-isoprene-styrene and combinations thereof.

9. The method according to claim 1, wherein the cellulosic fibers include one or more selected from the group consisting of hardwood fiber, kenaf fibers, wheat fibers, rice hulls, hemp fibers, jute fibers, flax fibers, ramie fibers, softwood fibers, hardwood pulp, softwood pulp, wood flour, pelletized recycled paper, and combinations thereof.

10. The method according to claim 1, wherein the cellulosic fibers have a diameter of at least 0.1 μm.

11. The method according to claim 1, wherein the cellulosic fibers include wood flour and/or wood fibers.

12. The method according to claim 1, wherein the foamable mixture comprises one or more additives selected from the group consisting of heat stabilizers, light stabilizers, plasticizers, dyes, pigments; anti-blocking agents; slip agents; lubricants; coloring agents; antioxidants; ultraviolet light absorbers; fillers; anti-static agents; impact modifiers, anti-microbial agents, and combinations thereof.

13. The method according to claim 1, wherein the copolymer and elastomeric copolymer are combined by melt blending.

14. The method according to claim 1, wherein the copolymer composition and cellulosic fibers are combined by melt blending.

15. The method according to claim 1, wherein the copolymer, cellulosic fiber and optional elastomeric polymers and/or optional other additives are dry blended and added to an extruder.

16. The method according to claim 1, wherein the copolymer and optionally the elastomeric polymer are added to a first extruder and then combined with the cellulosic fiber and optional other additives in a second extruder.

17. The method according to claim 1, wherein the combination of the copolymer composition and cellulosic fibers is extruded by melt mixing at a temperature sufficient for the copolymer to flow and extruding the combination through an extruder die one or more times.

18. The method according to claim 1, wherein the extruding operation comprises one or more single-screw extruders and/or twin-screw extruders.

19. The method according to claim 18, wherein the extruding operation comprises maintaining sufficient pressure in one or more extruders to prevent the blowing agent from escaping from the foamable mixture.

20. The method according to claim 1, wherein the byproduct blowing agent is selected from the group consisting of water vapor, carbon dioxide or combinations thereof.

21. The method according to claim 1, wherein the extruding operation comprises discharging the foamable mixture from an extruder into a die or other shaping device that causes the foamable mixture to expand to form a foamed article having a desired shape and or dimension.

22. The method according to claim 1, wherein the molding operation comprises:
A) feeding the foamable mixture into an extruder to form pellets;
B) placing the pellets in a mold corresponding to the desired shape of the foamed article; and
C) heating the mold and pellets to cause the pellets to expand and fuse to form the foamed article.

23. The method according to claim 1, wherein the foamed article comprises a micro foamed portion having a density of from about 0.6 to about 1.3 g/cm$^3$.

24. The method according to claim 1, wherein the foamed article comprises a structured foamed portion having a density of from about 0.45 to about 0.80 g/cm$^3$.

25. The method according to claim 1, wherein the micro foamed portion has a density of from about 0.6 to about 1.3 g/cm$^3$ and the structured foamed portion has a density of from about 0.45 to about 0.80 g/cm$^3$.

26. The method according to claim 1, wherein the cellulosic fiber-thermoplastic composite is compounded or otherwise blended with one or more other polymers to form a cellulosic fiber-thermoplastic composite blend.

* * * * *